(12) United States Patent
Chen et al.

(10) Patent No.: US 12,467,783 B2
(45) Date of Patent: Nov. 11, 2025

(54) OPTICAL SENSOR APPARATUS INCLUDING A PIXEL ARRAY HAVING THIN FILM TRANSISTORS (TFTS)

(71) Applicant: Japan Display Inc., Tokyo (JP)

(72) Inventors: Chungkai Chen, San Jose, CA (US); Naoki Takada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 499 days.

(21) Appl. No.: 17/981,497

(22) Filed: Nov. 7, 2022

(65) Prior Publication Data

US 2024/0151580 A1    May 9, 2024

(51) Int. Cl.
| | |
|---|---|
| *G01J 1/44* | (2006.01) |
| *H04N 25/616* | (2023.01) |
| *H04N 25/76* | (2023.01) |
| *H04N 25/77* | (2023.01) |
| *H04N 25/78* | (2023.01) |

(52) U.S. Cl.
CPC .............. *G01J 1/44* (2013.01); *H04N 25/616* (2023.01); *H04N 25/76* (2023.01); *H04N 25/77* (2023.01); *H04N 25/78* (2023.01)

(58) Field of Classification Search
CPC ........... G01J 1/44; H04N 25/78; H04N 25/77; H04N 25/76; H04N 25/616
See application file for complete search history.

(56) References Cited

U.S. PATENT DOCUMENTS

| | | | | |
|---|---|---|---|---|
| 5,536,932 | A * | 7/1996 | Hack ....................... | H10F 39/18 250/208.1 |
| 9,052,381 | B2 * | 6/2015 | Woolaway .............. | G01S 17/89 |
| 2021/0320143 | A1* | 10/2021 | Smit ....................... | H04N 25/79 |
| 2024/0373143 | A1* | 11/2024 | Kato ....................... | H04N 25/77 |

OTHER PUBLICATIONS

Ya-Hsiang Tai et al., "Implementation of correlated double sampling circuit on glass applied for active pixel sensing array", Journal of the Society for Information Display, vol. 30, No. 10, Revised: Mar. 9, 2022, Accepted: Apr. 13, 2022, 7 pages.

Yuan et al., "Correlated Double Sampling Circuit Integrated on Glass Used for Active Pixel Sensing Array", SID 2021 Digest, pp. 1340-1343.

\* cited by examiner

*Primary Examiner* — Jennifer D Bennett
(74) *Attorney, Agent, or Firm* — XSENSUS LLP

(57) ABSTRACT

A light sensing apparatus includes a pixel array including Thin Film Transistors (TFTs) and an interface integrated circuit including silicon transistors. The pixel array includes a plurality of pixel circuits. Each of the plurality of pixel circuits includes a light sensitive device and a detection TFT connected to the light sensitive device. The pixel array may also include a plurality of correlated double sampling (CDS) circuits each including a current source configured to provide current that biases a detection TFT in one of the pixel circuits to be configured as a source-follower. The interface integrated circuit includes at least one receiver circuit configured to receive an output of at least one of the CDS circuits. The CDS circuits may also include a bypass TFT, and the interface integrated circuit may also include a current source that provides current that biases a detection TFT in one of the pixel circuits to be configured as a source-follower when the bypass TFT is active.

15 Claims, 39 Drawing Sheets

OPTICAL SENSOR APPARATUS INCLUDING A PIXEL ARRAY HAVING THIN FILM TRANSISTORS (TFTS)

FIELD OF THE INVENTION

The present disclosure relates generally to an apparatus and system having an optical sensor, and in particular, circuitry for detecting light received by such an optical sensor.

BACKGROUND OF INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As shown in FIG. 31, a conventional optical sensor apparatus includes a pixel array sensor 3103, a controller 3102, and a silicon IC 3104. A conventional optical sensor system may include a user device 3100 containing the pixel array sensor 3103, controller 3102, and silicon IC 3104. The pixel array sensor 3103 may include one or more circuits that generate a signal when light is received. The silicon IC 3104 may include one or more silicon transistor circuits to generate information concerning the generated signal for a particular application, and the controller 3102 may generate control signals to control the operation of the pixel array sensor 3103 and silicon IC 3104.

Conventionally, to achieve advantageous light sensing properties, the pixel array sensor 3 is fabricated using Thin Film Transistor (TFT) technology on glass substrates. TFT devices on glass substrates are subject to large variations in threshold voltages ($V_{TH}$). The variation occurs between different TFTs on the same substrate and in a particular TFT over the use and lifetime of the including apparatus or system. The Si technology of the silicon IC 4 is typically more immune to temperature and lifetime variations of electrical parameters. The signal interface between the pixel array sensor 3103 and silicon IC 3104 may be limited in size and number of electrical connections.

Correlated Double Sampling (CDS) has been suggested as a technique for reducing variations in $V_{TH}$ of pixel array sensors. However, conventional solutions fail to provide adequate support for pixel sensor circuits, while minimizing the size and number of connections in the signal interface with the silicon IC.

SUMMARY OF INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

A light sensing apparatus according to an embodiment of the invention includes a pixel array including Thin Film Transistors (TFTs), and an interface integrated circuit including silicon transistors. The pixel array includes a plurality of pixel circuits, each of the plurality of pixel circuits including a light sensitive device and a detection TFT connected to the light sensitive device, and a plurality of correlated double sampling (CDS) circuits each including a current source configured to provide current that biases a detection TFT in one of the pixel circuits to be configured as a source-follower. The interface integrated circuit includes at least one receiver circuit configured to receive an output of at least one of the CDS circuits.

The light sensing apparatus according to the embodiment may be arranged so that each of the CDS circuits includes a capacitor; a first side of the capacitor is connected to an output of a pixel and the current source; and a second side of the capacitor is connected to the receiver in the interface integrated circuit via a contact on a connector of the pixel array.

The light sensing apparatus according to the embodiment may be arranged so that each CDS circuit further includes a hold TFT; a drain of the hold TFT is connected the second side of the capacitor; and a source of the hold TFT is connected to a variable ground voltage.

The light sensing apparatus according to the embodiment may include a control circuit configured to drive a gate of the hold TFT in each CDS circuit to thereby control a timing of an operation of each CDS circuit.

The light sensing apparatus according to the embodiment may be arranged so that each of the plurality of pixel circuits further includes a reset TFT and a read TFT; and the control circuit is further configured to drive a gate of the reset TFT and a gate of the read TFT to control a timing of an operation to transfer a voltage generated by a light received at the light sensing device to the receiver via the CDS circuit.

The light sensing apparatus according to the embodiment may be arranged so that the pixel array further includes a current mirror circuit including a plurality of mirror TFTs each configured to provide a mirror current as the current source of one of the CDS circuits, and a main TFT configured to receive a drive current from the interface integrated circuit to thereby control the mirror current in each of the plurality of mirror TFTs.

The light sensing apparatus according to the embodiment may be arranged so that the plurality of pixel circuits are arranged in rows and columns of pixel circuits; each of the plurality of CDS circuits is connected to a different column of pixel circuits included in the plurality of pixel circuits; and an output of each of the plurality of CDS circuits is provided to the at least one receiver circuit.

The light sensing apparatus according to the embodiment may be arranged so that each of the plurality of CDS circuits further includes a multiplex TFT connected between the capacitor and the receiver; the plurality of pixel circuits are arranged in rows and columns of pixel circuits; each of the plurality of CDS circuits is connected to a different column of pixel circuits included in the plurality of pixel circuits; and outputs of at least two of the plurality of CDS circuits are provided one receiver circuit.

A light sensing apparatus according to another embodiment includes a pixel array including Thin Film Transistors (TFTs) and an interface integrated circuit including silicon transistors. The pixel array includes a plurality of pixel circuits, each of the plurality of pixel circuits including a light sensitive device and a detection TFT connected to the light sensitive device, and a plurality of correlated double sampling (CDS) circuits each including a bypass TFT. The interface integrated circuit includes a current source configured to provide current that biases a detection TFT in one of the pixel circuits to be configured as a source-follower when the bypass TFT is active, and at least one receiver circuit configured to receive an output of at least one of the CDS circuits.

The light sensing apparatus according to the embodiment may be arranged so that each of the CDS circuits includes a capacitor; a first side of the capacitor is connected to an output of a pixel and the current source; and a second side of the capacitor is connected to the receiver in the interface integrated circuit via a contact on a connector of the pixel array.

The light sensing apparatus according to the embodiment may be arranged so that each CDS circuit further includes a hold TFT; a drain of the hold TFT is connected the second side of the capacitor; and a source of the hold TFT is connected to a variable ground voltage.

The light sensing apparatus according to the embodiment further includes a control circuit configured to drive a gate of the hold TFT and a gate of the bypass TFT in each CDS circuit to thereby control a timing of an operation of each CDS circuit.

The light sensing apparatus according to the embodiment may be arranged so that each of the plurality of pixel circuits further includes a reset TFT and a read TFT; and the control circuit is further configured to drive a gate of the reset TFT and a gate of the read TFT to control a timing of an operation to transfer a voltage generated by a light received at the light sensing device to the receiver via the CDS circuit.

The light sensing apparatus according to the embodiment may be arranged so that the plurality of pixel circuits are arranged in rows and columns of pixel circuits; each of the plurality of CDS circuits is connected to a different column of pixel circuits included in the plurality of pixel circuits; and an output of each of the plurality of CDS circuits is provided to the at least one receiver circuit.

The light sensing apparatus according to the embodiment may be arranged so that each of the plurality of CDS circuits further includes a multiplex TFT connected between the capacitor and the receiver; the plurality of pixel circuits are arranged in rows and columns of pixel circuits; each of the plurality of CDS circuits is connected to a different column of pixel circuits included in the plurality of pixel circuits; and outputs of at least two of the plurality of CDS circuits are provided one receiver circuit.

BRIEF DESCRIPTION OF THE DRAWINGS

The scope of the present disclosure is best understood from the following detailed description of exemplary embodiments when read in conjunction with the accompanying drawings, wherein.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Figure 1:
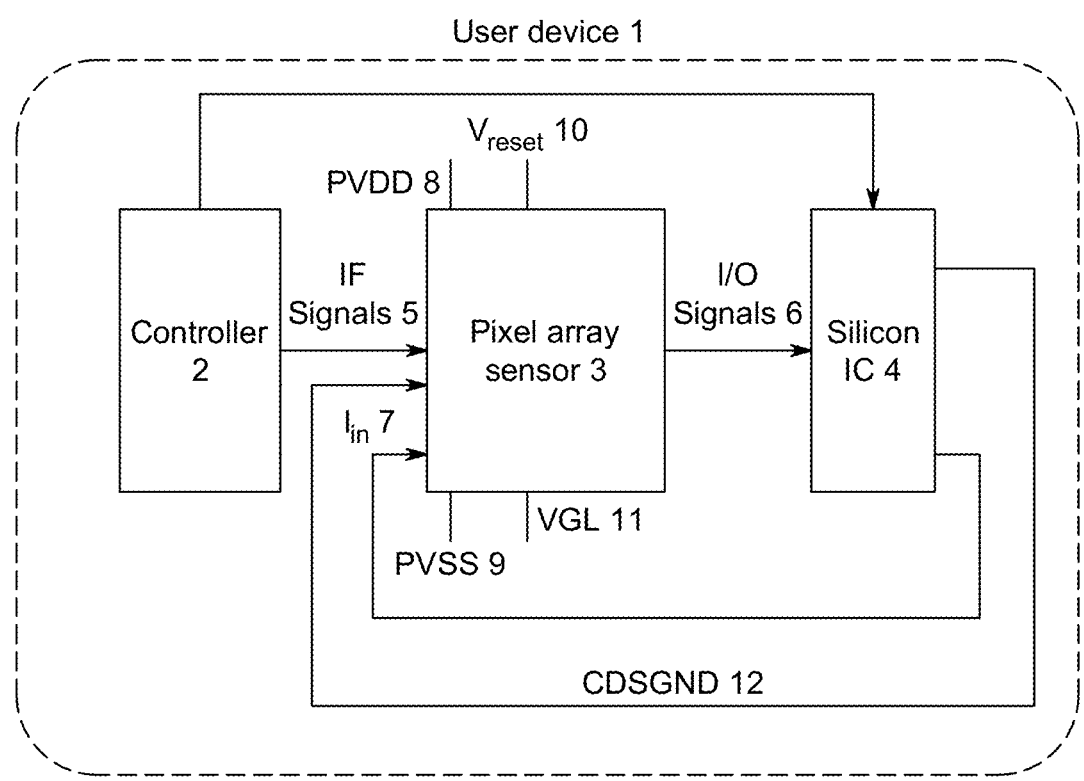
FIG. 1 is a block diagram of an embodiment of the invention.

FIG. 1 shows an embodiment of a user device 1 including a controller 2, pixel array sensor 3, and silicon IC 4. The pixel array sensor 3 is connected to power signals PVDD 8 and PVSS 9, CDSGND 12 and Iin 7, as well as control signals Vreset 10, VGL 11, IF signals 5, and I/O signals 6. The IF signals 5, including but not limited to the control signals of reset switch, read switch and mux switch in pixel array sensor 3, are connected to the controller 2. The I/O signals 6, including the optical sensor's light output signal, are connected to the Silicon IC 4. The Silicon IC 4 also provides the Iin 7 and CDSGND 12.

The user device 1 may be any system including an optical sensing function, such as a vein sensor function, SpO2 sensor function, fingerprint sensor function, etc. . . . . Examples of user device 1 may include a wearable device such as a ring or watch, a cellular phone, personal information device, a health monitoring device, etc. . . . .

Figure 2A:
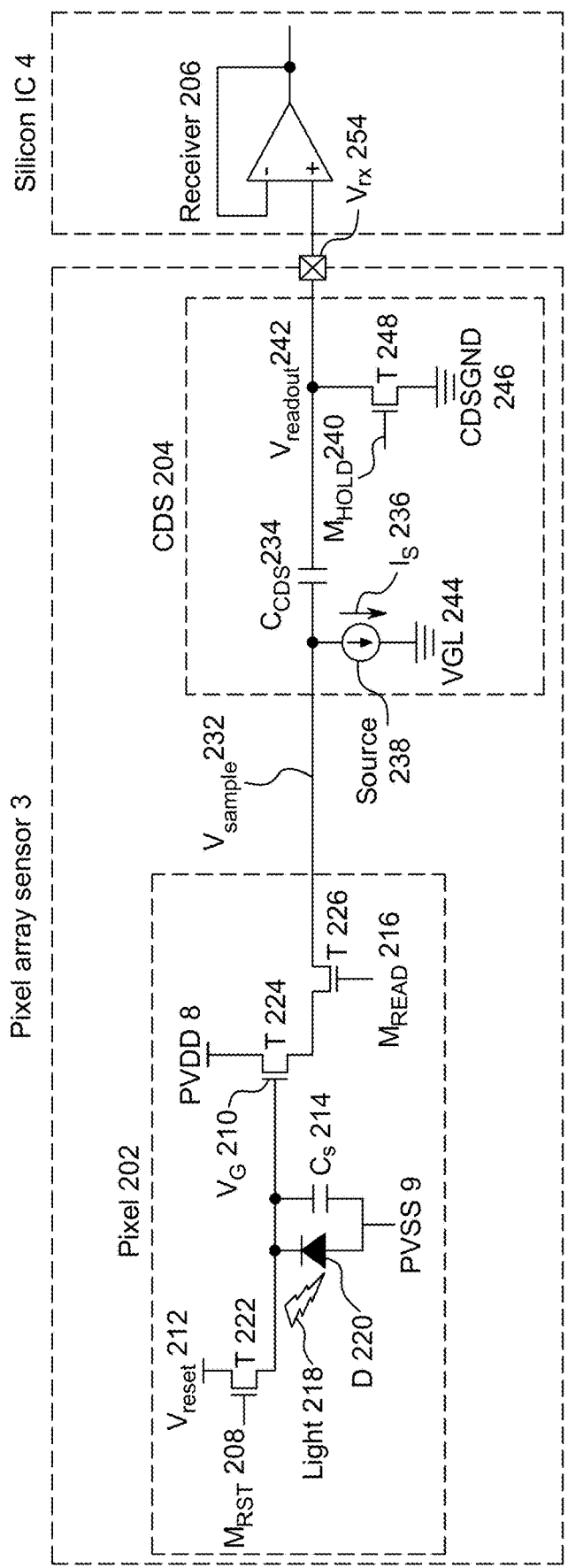
FIG. 2A shows circuit details of the embodiment of the invention.

FIG. 2A shows a detailed embodiment and equivalent circuit model of the pixel array sensor 3 and silicon IC 4. The pixel array sensor 3 includes at least one pixel 202 and at least one CDS 204. The Silicon IC 4 includes at least one receiver 206 configured to receive an output signal from the CDS 204.

Pixel 202 includes a diode D 220, which is a light sensitive device that generates a current flowing into PVSS 9 when light 218 is received. The cathode of D 220 is connected to a source of TFT T 222, and the anode of D 220 is connected to PVSS 9. A drain of T 222 is connected to Vreset 212. A gate of T 222 connected to a control signal MRST 208 generated by the controller 2. The source of T 222 is also connected to the gate of a detection transistor TFT T 224 and one end of a capacitor Cs 214. Detection transistor TFT T 224 detects a voltage on the diode D 220 and is configured as a "source-follower" in which the voltage at the source of T 224 approximately follows the gate voltage. The other end of the capacitor Cs 214 is connected to PVSS 9. A drain of T 224 is connected to PVDD 8, and a source of T 224 is connected to the drain of TFT T 226. A gate of T 226 is connected to control signal MREAD 216 generated by the controller 2. The source of T 226 is output from the pixel 202, and becomes output node Vsample 232 provided to the input of CDS 204.

CDS 204 includes an ideal current source 238 connected to the input Vsample 232. The ideal current source 238 generates current IS 236 provided to VGL 244. The ideal current source 238 is connected to a VGL 244. Also connected to the input Vsample 232 is one end of a capacitor CCDS 234. The other end of the capacitor CCDS 234 is connected to node Vreadout 242, which is also connected to a drain of TFT 248. A gate of T 248 is connected to control signal MHOLD 240 generated by the controller 2. A source of T 248 is connected to a controllable ground CDSGND 246. Vreadout 242 is output from the pixel array sensor 3 as Vrx 254 via a connection on a connector between the pixel array sensor 3 and the silicon IC 4. The connector may include a direct connection between the pixel array sensor 3 and the silicon IC 4 using Chip-On-Glass (COG) technology, and may also include an indirect connection via Flexible Printed Circuit (FPC), Chip-On-Film (COF) technologies, or other connection technology. The CDS 204 output signal Vrx 256 is received by receiver 206 in the silicon IC 4. Although only one receiver 206 is depicted in FIG. 2A, the silicon IC 4 may include a plurality of receivers 206 to receive signals from one or more of the CDS outputs.

The current source 238 is arranged to sink current Is 236 from a node Vsample 232, which is arranged between the pixel 202 and the CDS 204. Therefore, the current source 238 provides a bias current for the source-follower function of T 224.

In this example and all other disclosed examples, each of the TFTs is configured as an n-channel MOSFET. However, a corresponding alternative circuit including p-channel MOSFETs is also within the scope of the invention.

Figure 2B:
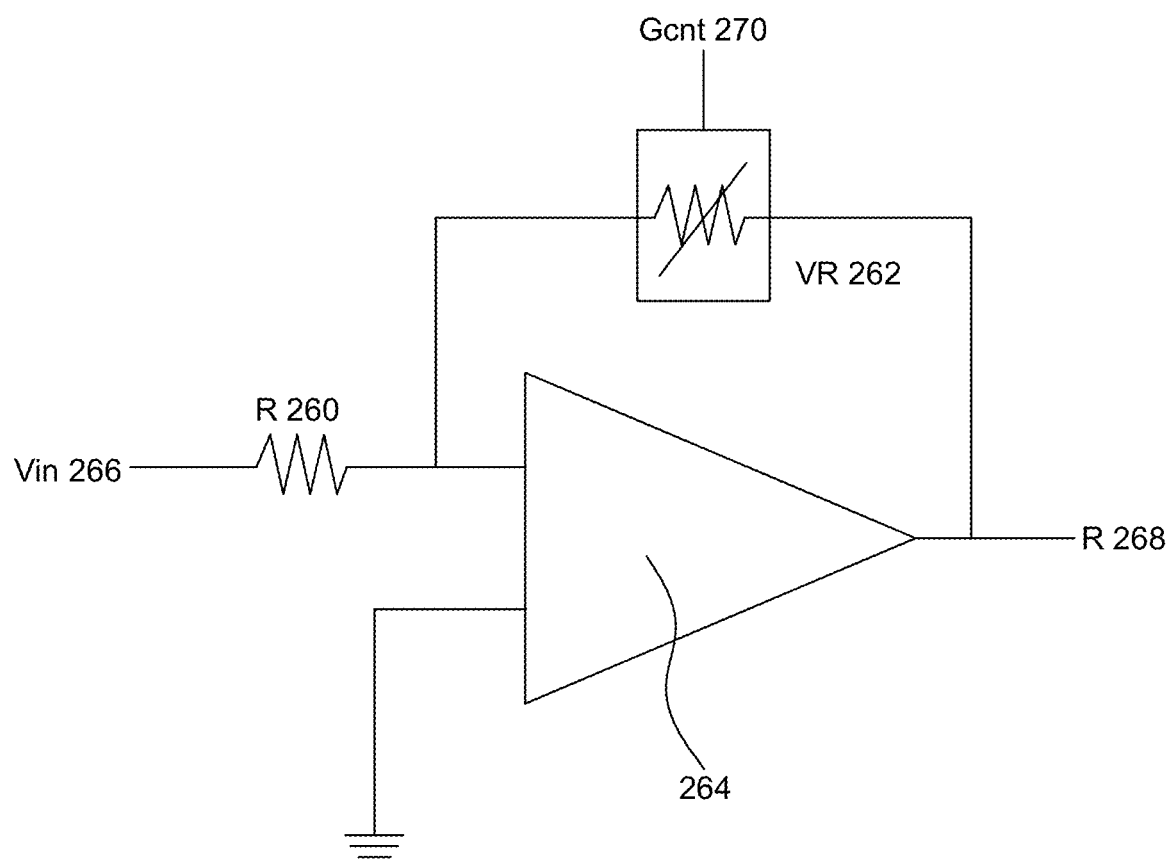
FIG. 2B shows further circuit details of the embodiment of the invention.

A register-controlled voltage source, controlled by the controller or a circuit as shown, may be used to control the voltage of CDSGND based on light intensity, so that when light intensity is high, CDSGND may be set to a negative voltage to thereby increase the dynamic range. The circuits in FIG. 2B can be used to realize such a register-controlled negative voltage source. In FIG. 2B, Vout's (i.e., CDSGND) voltage level is determined by the controlled value or controllable resistor VR 262. The resistance of VR 262 is controlled by a signal Gcnt 270 provided from the controller 2, e.g., as a register setting. Op amp 264 includes an internal negative charge pump to allow the op amp's output R 268 to go negative. The circuit of FIG. 2B may be arranged in the silicon IC 4 to take advantage of high gain and speed provided by silicon transistors.

Figure 3:
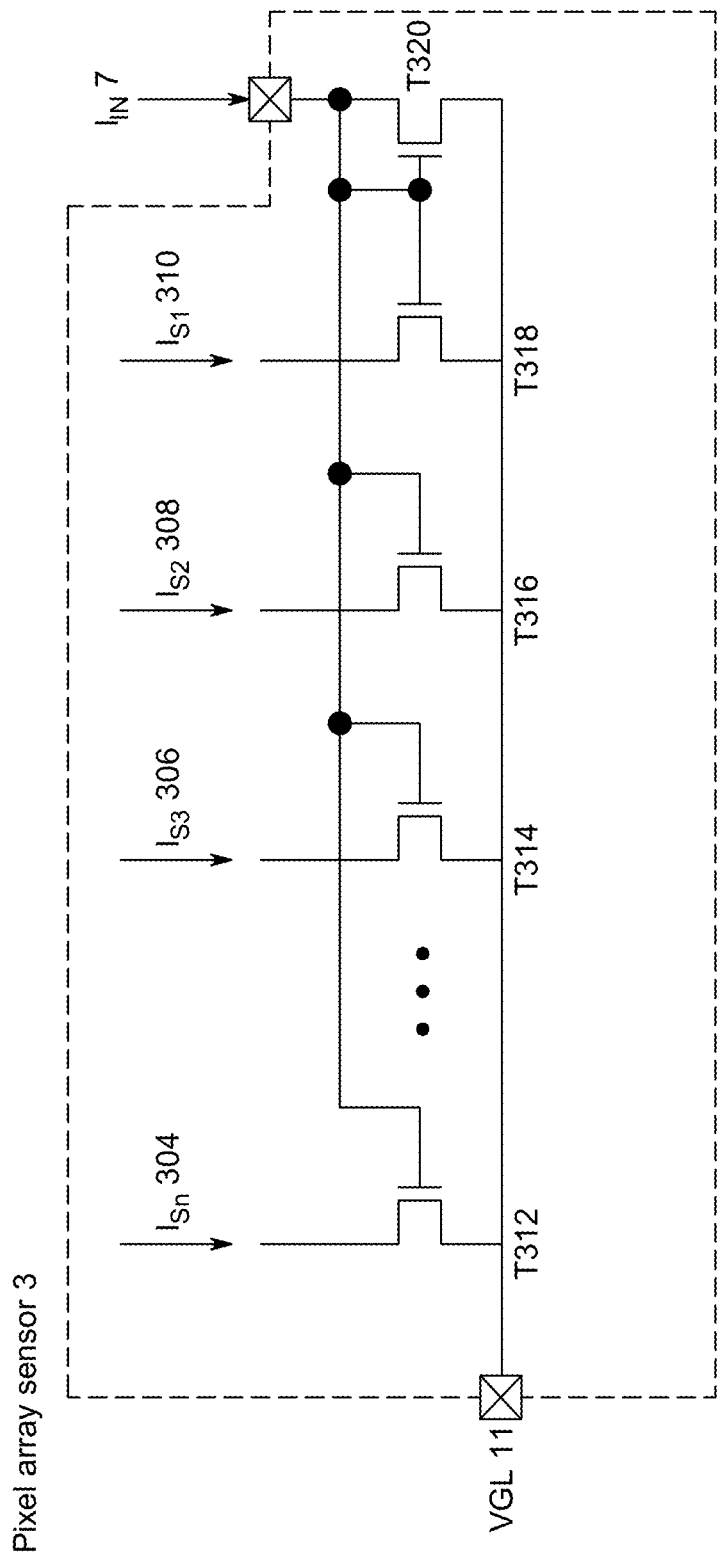
FIG. 3 shows further circuit details of the embodiment of the invention.

FIG. 3 shows a current mirror circuit included in the pixel array sensor 3 that implements the ideal current source 238, and provides current IS, for each pixel 202. The current mirror circuit in FIG. 3 receives current Tin from the silicon IC 4. The current mirror includes a main TFT T 320 that receives the current Tin under bias from VGL 11. The current mirror includes TFTs T 312, T 314, T 316, and T 318 each configured to generate corresponding currents Isn 304, Is3 306, Is2 308, and Is1 310, according to the current driving through the main TFT T 320 and under bias from VGL 11.

Figure 4A:
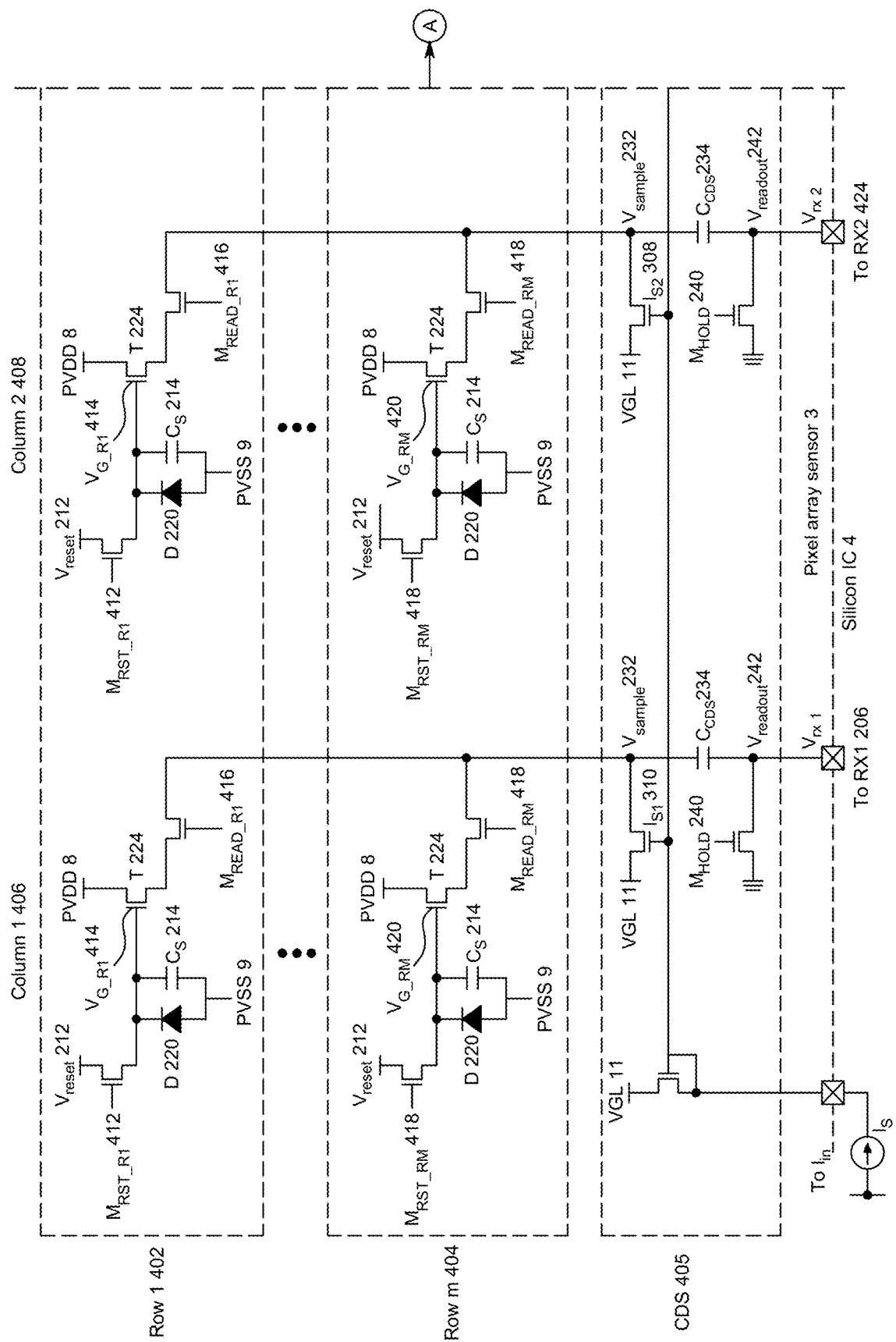
FIG. 4A shows further circuit details of the embodiment of the invention.
Figure 4B:
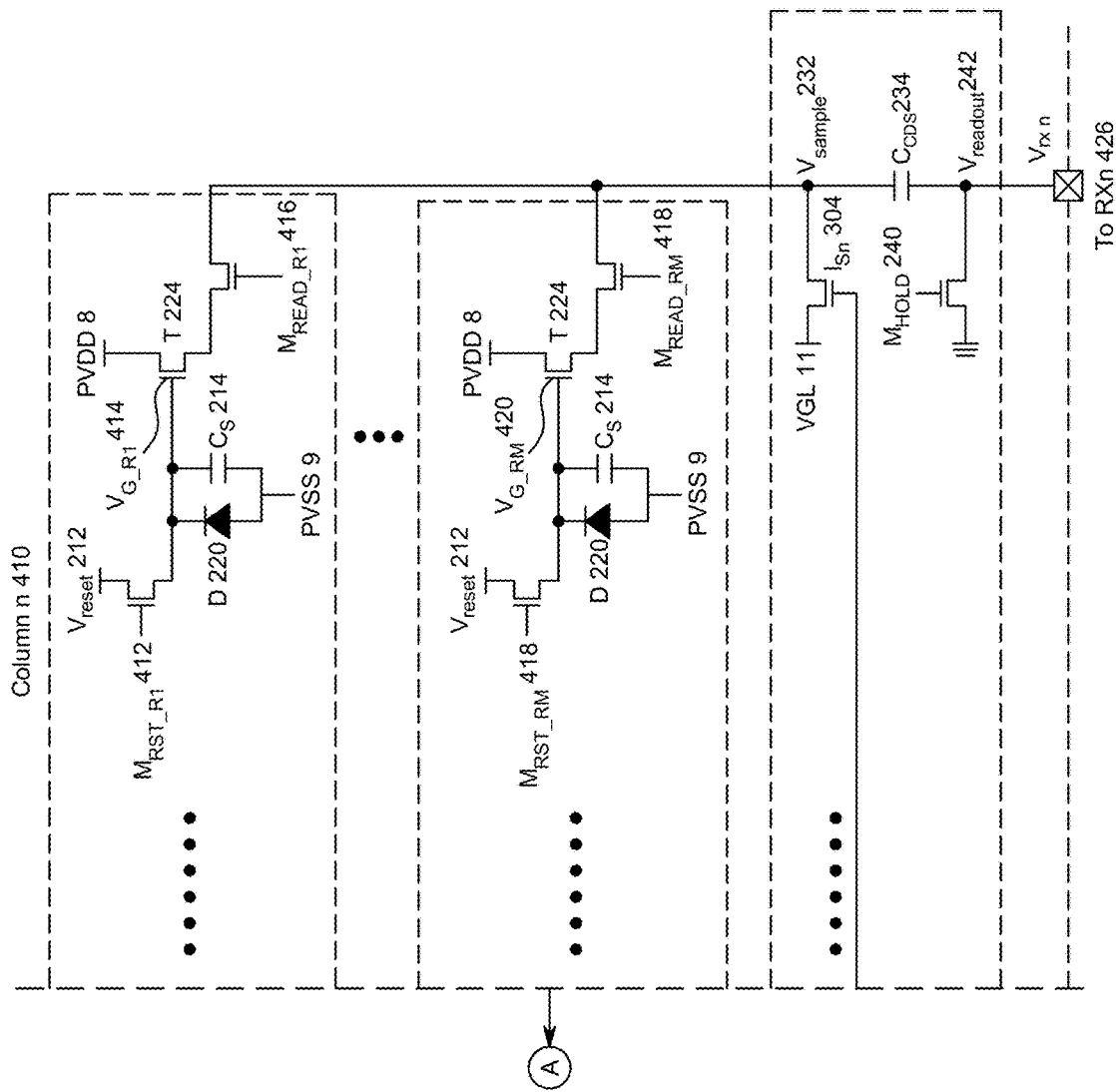
FIG. 4B shows further circuit details of the embodiment of the invention.

FIGS. 4A and 4B shows an embodiment in which the pixel array sensor 3 includes m rows by n columns of pixels 202, wherein m and n are integers. The rows of pixels 202 include row 1 402 through row m 404. The columns of pixels 202 include column 1 406 and column 2 408 through column n 410. The pixel array sensor 3 also includes CDS 405 including one CDS 204 circuit for each of the n columns. Connections to the Silicon IC 4 are provide for Iin, and a Vrx signal for each column, Vrx 1 . . . Vrx 3.

Figure 5:
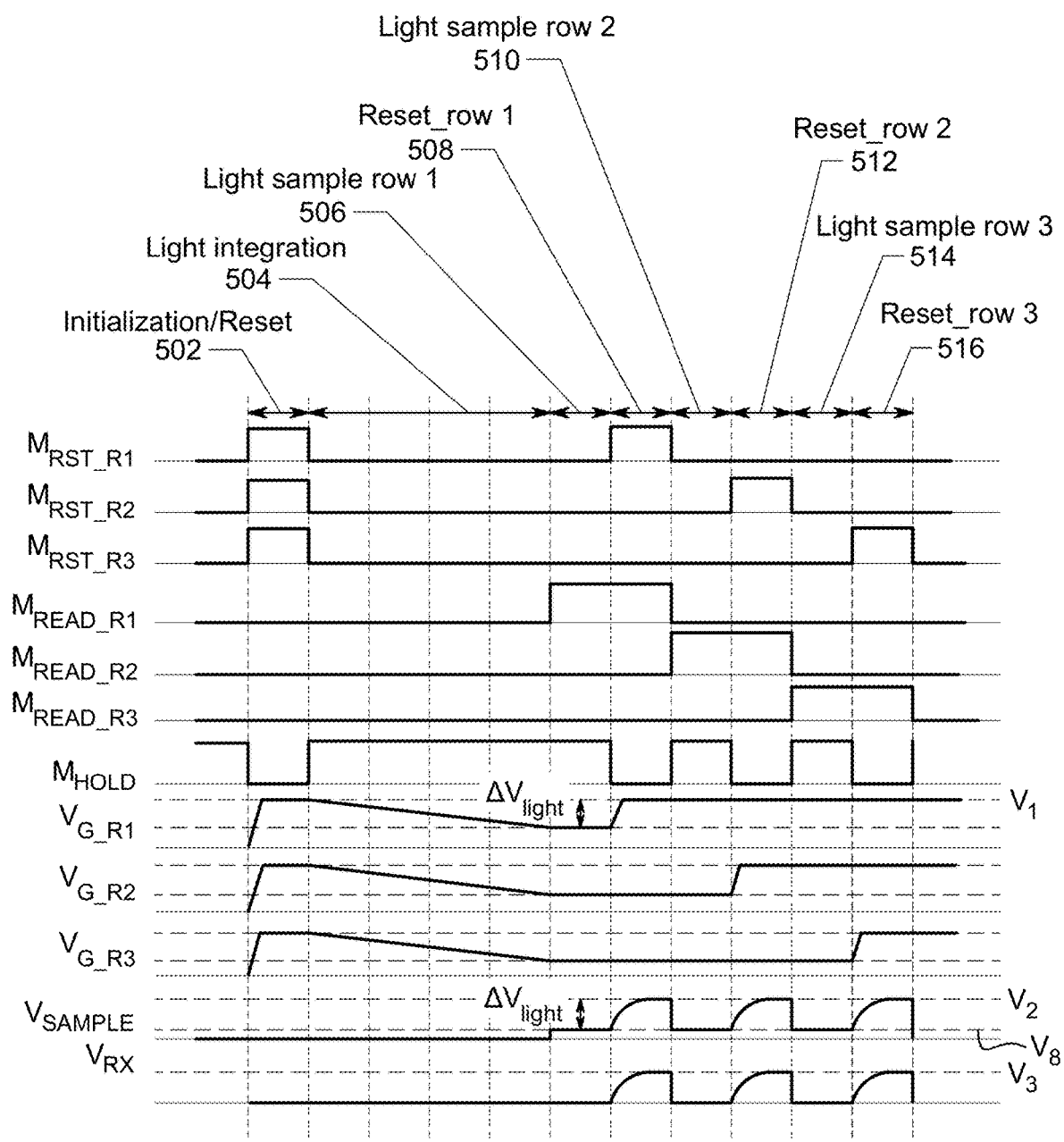
FIG. 5 shows an example of an operation of the embodiment of the invention.

FIG. 5 is a timing diagram that illustrates an operation of the pixel array sensor 3 and a corresponding controller 2 when detecting an incident light. During an initialization/reset time period 502, MRST_R1, MRST_R2, and MRST_R3 are set to a high voltage by the controller 2, and MREAD_R1, MREAD_R2, MREAD_R3, and MHOLD are set to a low voltage by the controller 2. MRST_R1 corresponds to an MRST_R1 signal as in FIG. 4. MRST_R2 and MRST_R3 correspond to a similar signal as in MRST_RM of FIG. 4, but for rows 2 and 3, respectively. Similarly, MREAD_R1 corresponds to MREAD_R1 as in FIG. 4, while MREAD_R2 and MREAD_R3 correspond to a similar signal as MREAD_RM in FIG. 4, but for rows 2 and 3, respectively.

Accordingly, the gate control signals VG_R1, VG_R2, and VG_R3 are all driven high during the initialization/reset time period 502, and VRX for each column is 0.

During a common light integration time period 504, MRST_R1, MRST_R2, MRST_R3, MREAD_R1, MREAD_R2, and MREAD_R3 are all set low, while MHOLD is set high. During the light integration time period

504, based on the amount of light detected by diode D 220 in each pixel 202, a detected voltage is generated at the VG node and charges capacitor Cs, in each pixel 202 of the pixel sensor array 3. In particular, the photocurrent generated by D 220 adds −ΔVlight on top of Vreset.

After the light integration time period 504 the voltage in Cs corresponding to the amount of detected light is transferred a row at a time to the silicon IC 4. In particular, the voltage VG, which is stored in each capacitor Cs of each row, is first transferred to the CCDS capacitor and then received by the silicon IC 4.

For example, during light sample_row 1 time period 506, MRST_R1 remains low, while MREAD_R1 is set high, and MHOLD remains high. Thus, a charge related to the stored charge in Cs, equal to VG and representing an amount of received light, appears on capacitor CCDS. As shown in FIG. 5, during light sample_row 1 time period 506, the voltage at VG_R1 is V1−ΔVlight, where V1 is Vreset and V8=Vsample(L). Vsample becomes Vsample(L) according to equation (1):

$$V\text{sample}(L) = V\text{reset} - \Delta V\text{light} - (V th + \Delta V th) - \sqrt{Is/K} \quad (1)$$

where Vth is the threshold voltage of T 224, Is is the current value of current source 238, K is ½*μ*$C_{ox}$*W/L; where μ is electron mobility, $C_{ox}$ is oxide capacitance and W and L are transistor width and length and ΔVth is the difference between T 224's actual Vth from its nominal value.

During the Reset_row 1 time period 508, MRST_R1 goes high and Vsample becomes Vsample(R) according to equation (2):

$$V\text{sample}(R) = V\text{reset} - (V th + \Delta V th) - \sqrt{Is/K} \quad (2)$$

MREAD_R1 stays high and MHOLD goes low, thereby allowing the voltage stored in CCDS 234 to be transferred to Receiver 206 in the Silicon IC 4. In particular, the value at Vreadout during this time (Vreadout(R)) is shown by equation (3).

$$V\text{readout}(R) = V\text{sample}(R) - V\text{sample}(L) = \Delta V\text{light} \quad (3)$$

By substituting the values of Vsample(R) and Vsample(L) from equations (1) and (2) above, it can be seen that the terms representing Vth, ΔVth, Is, and K cancel each other out. Thus, according to this embodiment, variations in those parameters have no effect on Vreadout(R), thereby resulting in a received value corresponding to the amount of received light that is insensitive to those parameters, including insensitive to variations in Vth. Therefore, during the Reset_row 1 time period 508, the Silicon IC 4 receives a voltage corresponding to the amount of light received by the pixel 202.

As shown by FIGS. 4A, 4B, and 5, the voltage VRX, corresponding to Vreadout for each column, is simultaneously output during a reset_row time period. As shown by FIG. 5, through subsequent cycles of light sample_row (i.e., light sample_row 2 time period 510, and light sample_row 3 time period 514) charges related to the stored Cs charges are transferred to the CCDS, and during reset_row time periods (i.e., reset_row 2 time period 512, and reset_row 3 time period 516), the voltage VRX corresponding to Vreadout for each different row is sequentially output.

Note that although the time phases shown in FIG. 5 are indicated as one or multiples of individual clock cycles, the actual duration of each time period is merely shown for illustration purposes and each time period may actually be implemented by the invention in various lengths depending upon the corresponding system requirements. For example, the light integration time period may be longer by orders of magnitude than other periods shown.

The timing diagrams are labeled with one or more of the following voltage references: V1=Vreset; V2=Vsample(R) =Vreset−(Vth+ΔVth)−Sqrt(Is/K); V3=ΔVlight; V4=Vdd−ΔVlight; V5=Vreset−ΔVlight; V6=Vreset+ΔVlight; V7=Vdd; V8=Vsample(L)=Vreset−ΔVlight−(Vth+ΔVth)−Sqrt(Is/K).

Figure 6A:
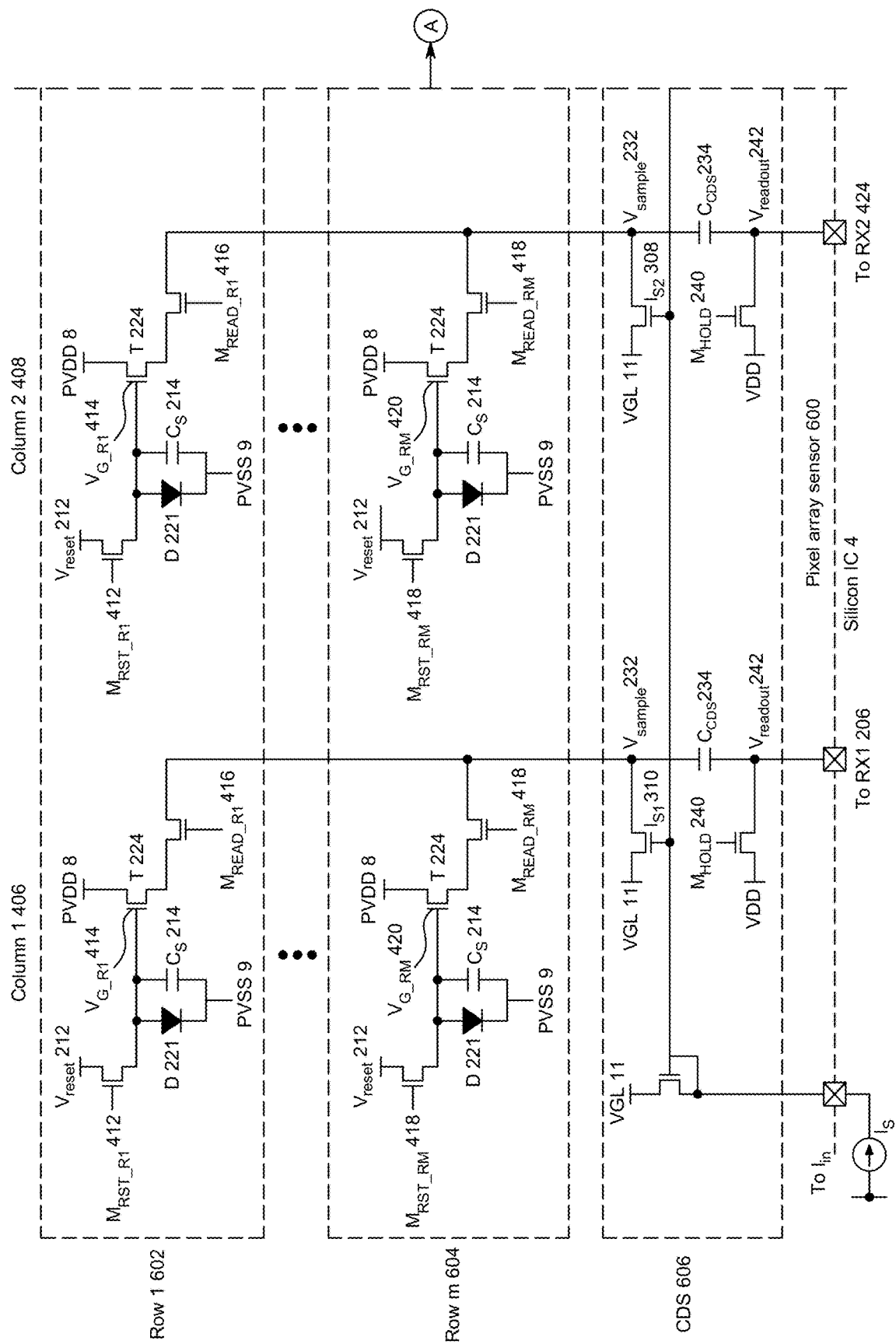
FIG. 6A shows further circuit details of an alternative embodiment of the invention.
Figure 6B:
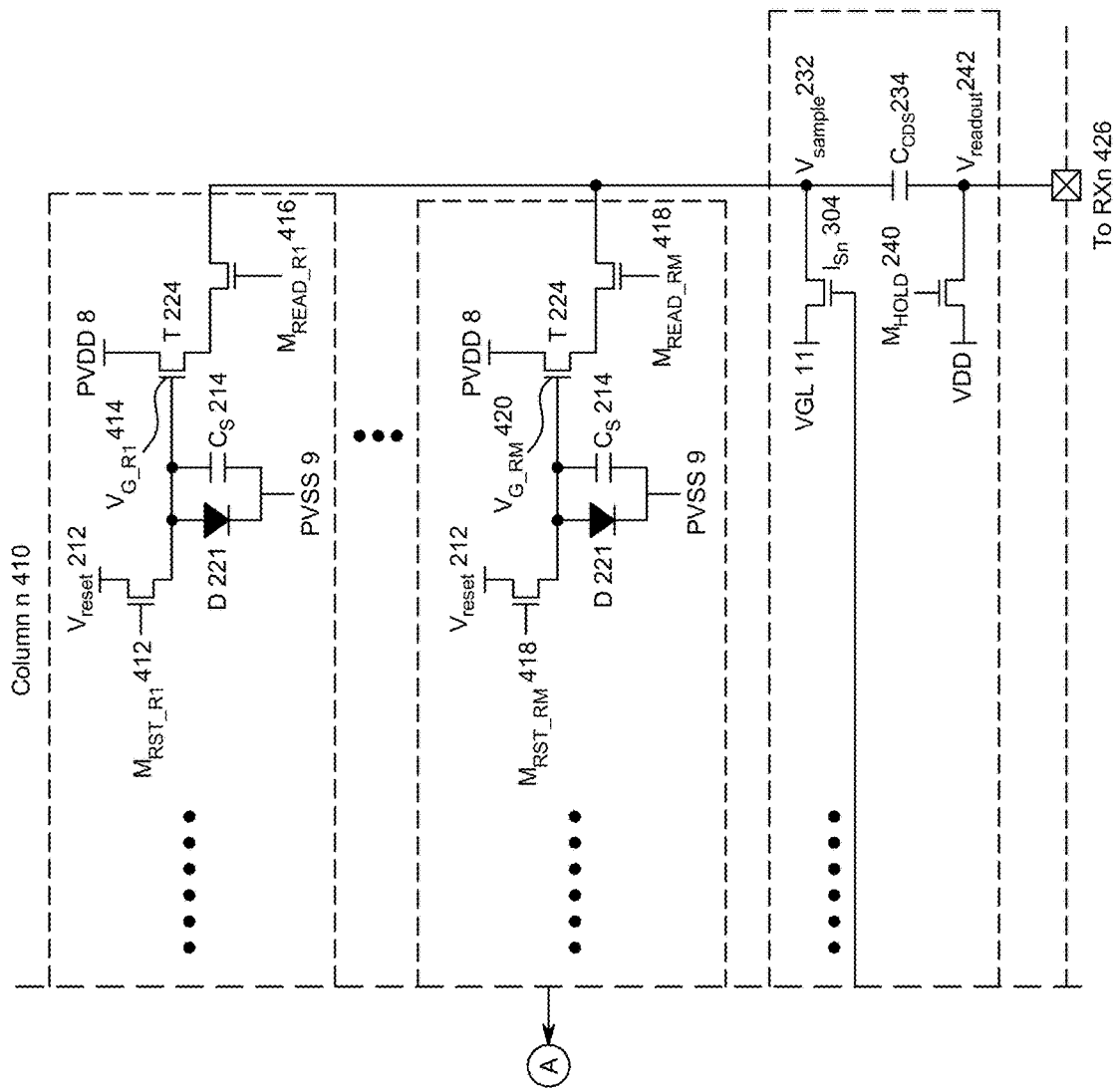
FIG. 6B shows further circuit details of the alternative embodiment of the invention.
Figure 7:
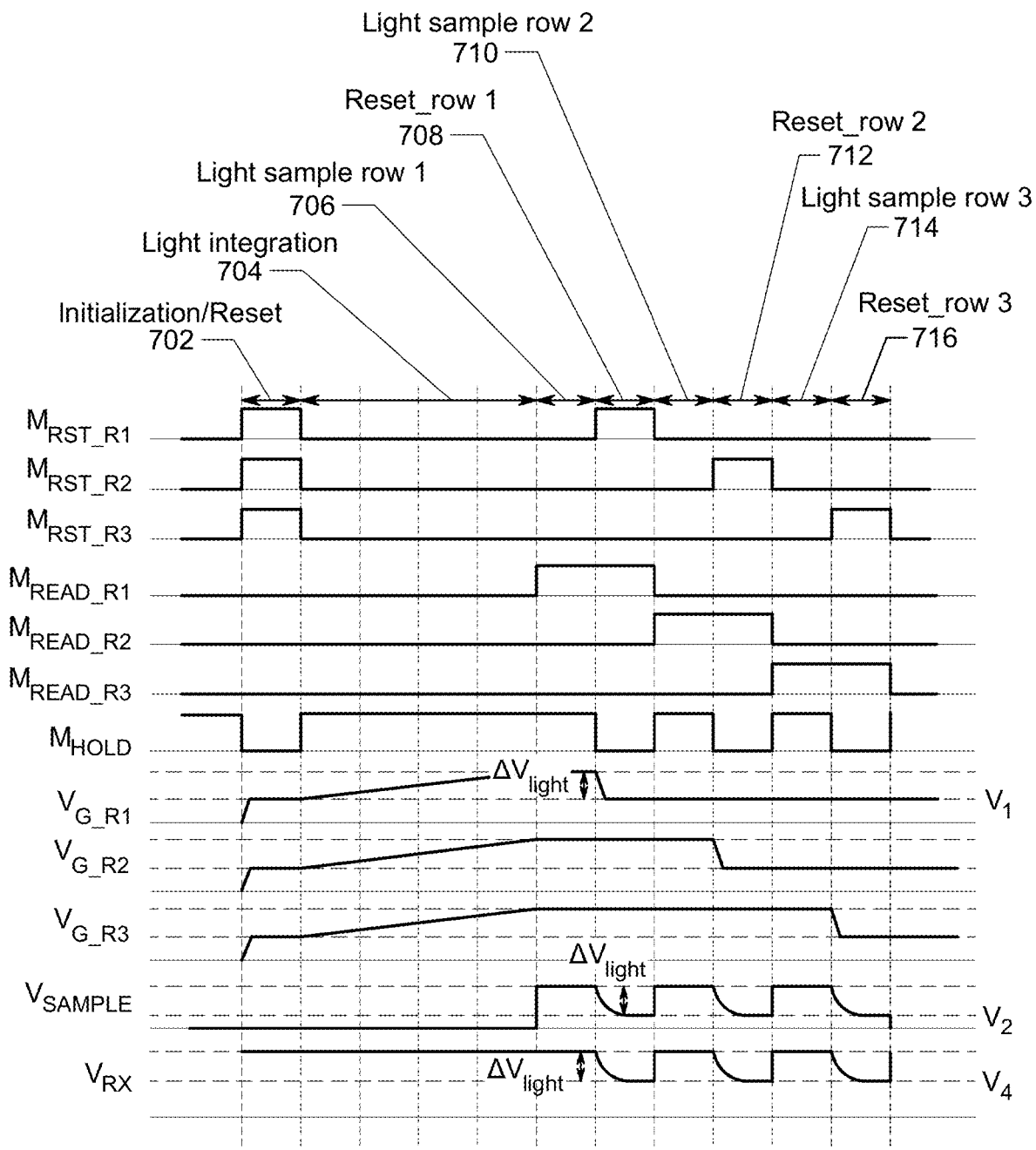
FIG. 7 shows an example of an operation of the alternative embodiment of the invention.

FIGS. 6A and 6B show an alternative embodiment in which the pixel is configured with a light sensitive diode D 221 arranged with an opposite polarity to the diode D 220 in circuits of FIGS. 4A and 4B. Therefore, light being received by diode D 221 causes a corresponding increase in VG, rather than a decrease of VG as in the embodiment of FIGS. 4A and 4B. As shown in FIG. 7, the general operation of this alternative embodiment is similar to the embodiment of FIG. 5, with identical control signal timing that produces different voltage polarities at VG, Vsample, and VRX resulting from the different polarity of the light sensitive diode D 221.

In the embodiments described above, a dedicated interface connection RX1-RXn is required to output the Vreadout for each column in the array of light sensor pixels. In the embodiments described below, the pixel array sensor circuitry is modified to multiplex the values of Vreadout for each column or each group of columns on one or more multiplexed interface connections.

Figure 8:
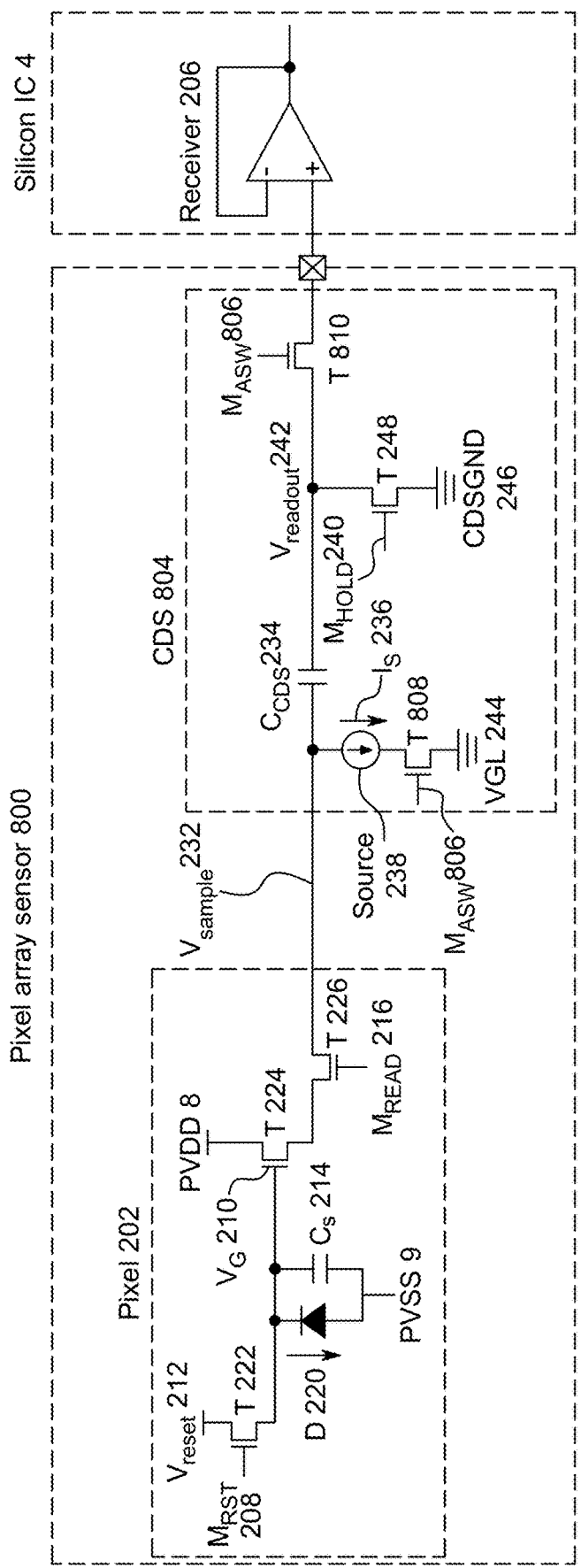
FIG. 8 shows circuit details of another embodiment of the invention.

FIG. 8 shows an embodiment including a multiplexing output capability for Vreadout. The embodiment of FIG. 8 is similar to that of FIG. 2, with the exception that each CDS 804 further includes a TFT transistor T 808 arranged between the current source 238 and VGL 244. A gate of transistor T 808 is controlled by a multiplex signal MASW 806. Transistor T 810 is arranged between CDS 804 and the output, and the gate of T 810 is also controlled by MASW 806.

Figure 9A:
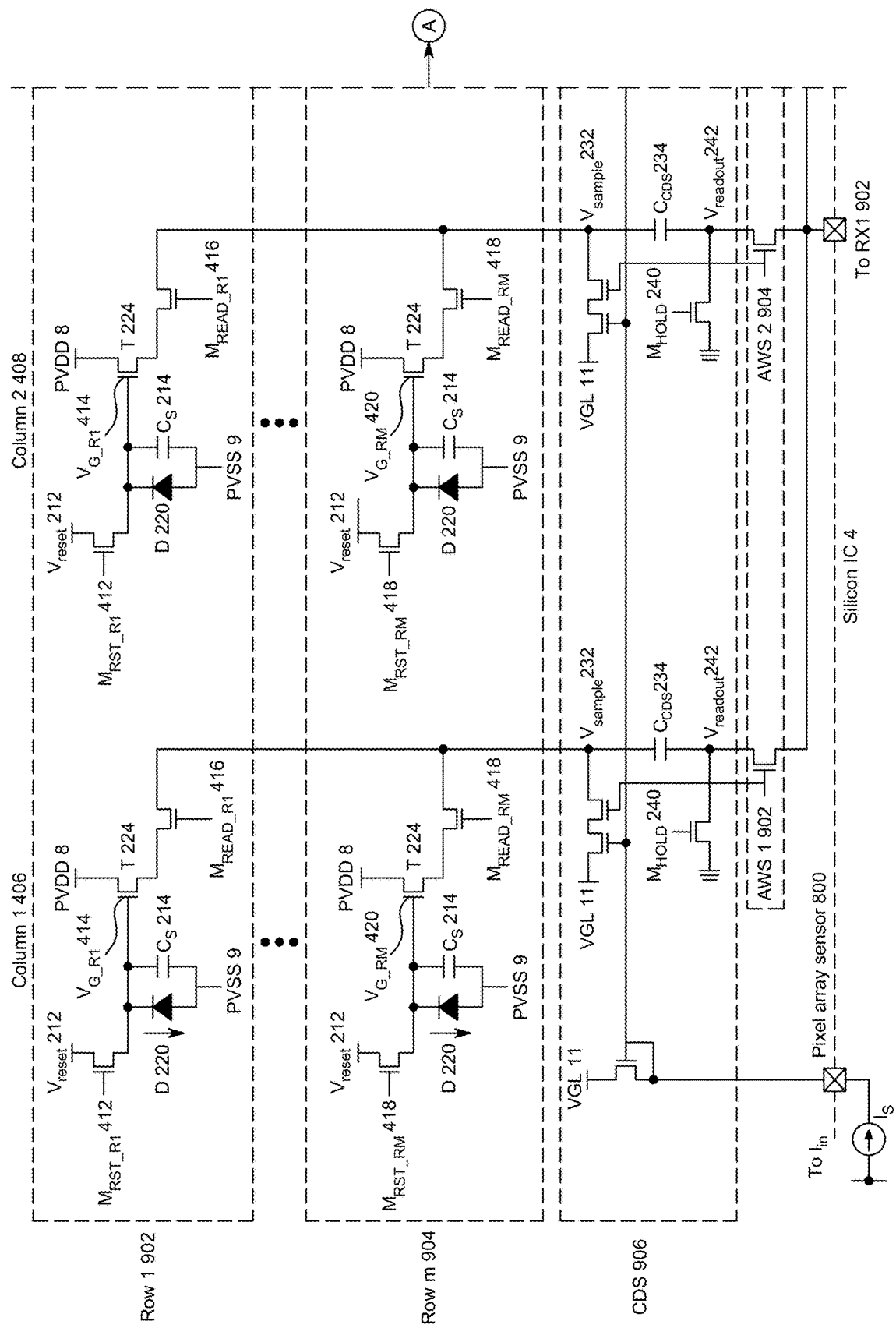
FIG. 9A shows further circuit details of the another embodiment of the invention.
Figure 9B:
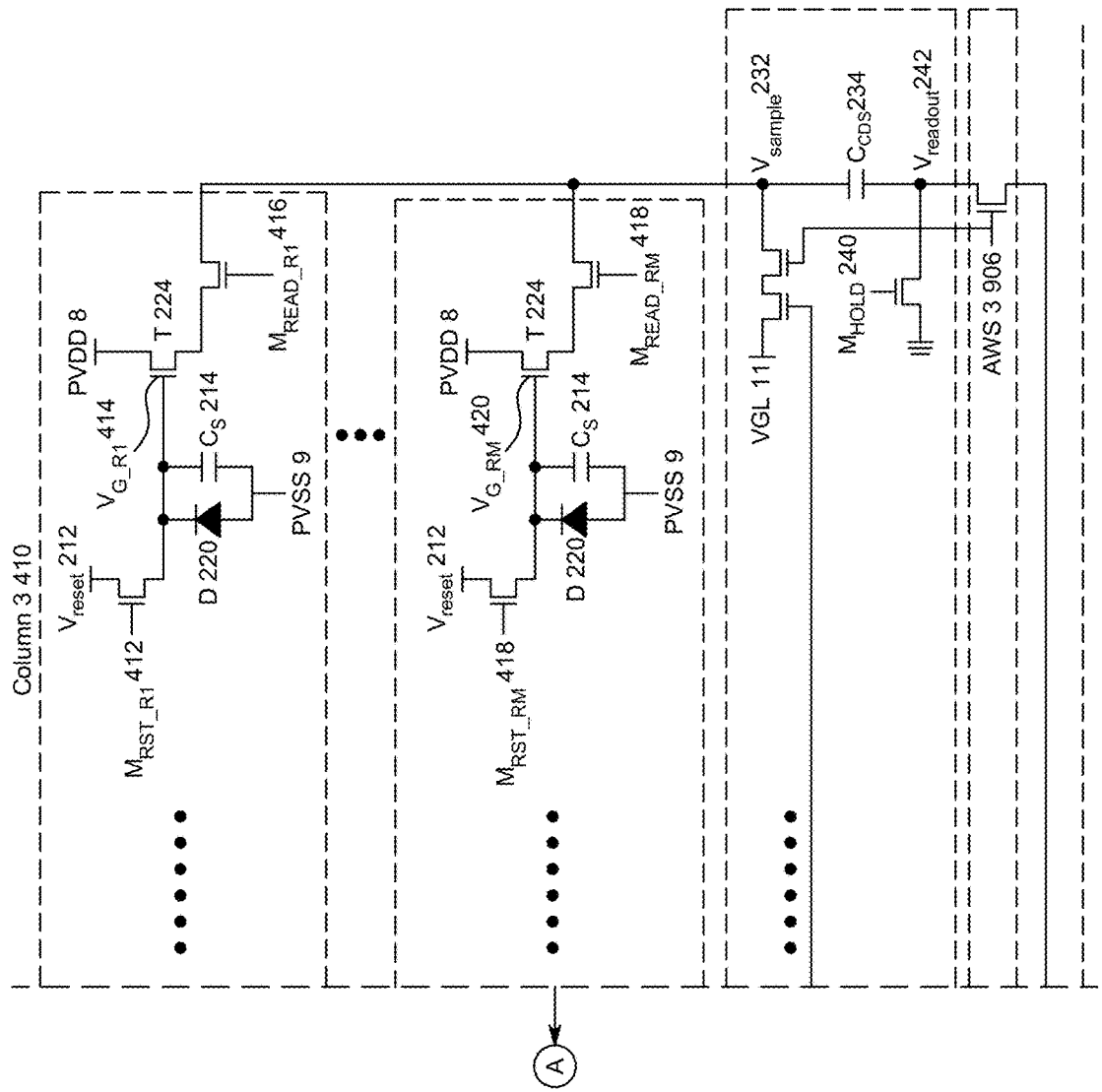
FIG. 9B shows further circuit details of the another embodiment of the invention.

FIGS. 9A and 9B show an array arrangement of pixel array sensor 800 where 3 columns are configured to share a single common output connection AFE RX1 902. The invention also includes other configurations having different numbers of columns sharing a signal common output connection. Each row of pixels 902/904 includes a pixel in each column 406/408/410. CDS 906 includes a CDS circuit for each column of pixels 406/408/410. TFTs controlled by AWS signals 902/904/906 control output/multiplexing of the light sensing signal from each column of pixels 406/408/410 to the shared output connection made to RX1 902.

Figure 10:
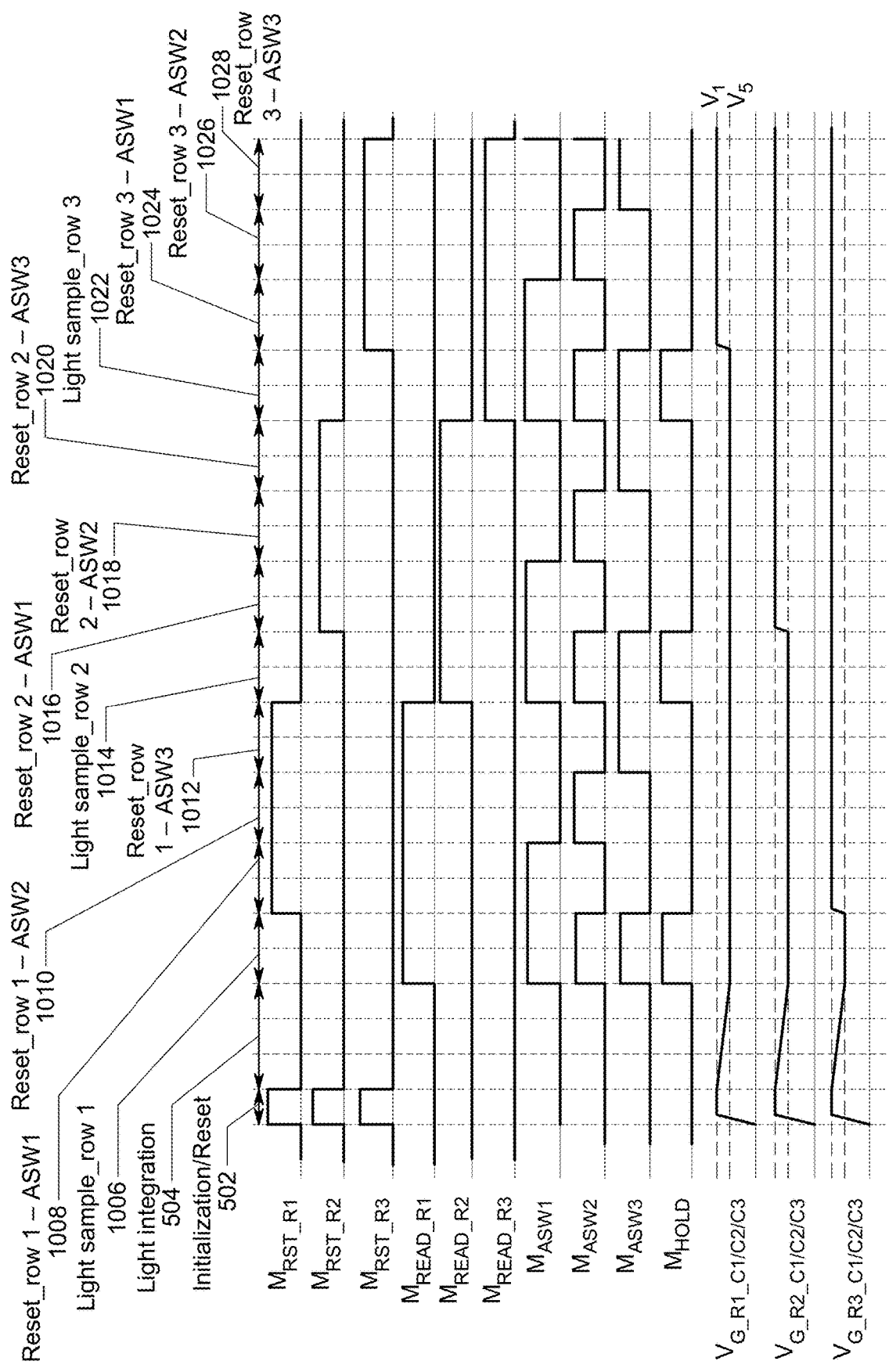
FIG. 10 shows an example of an operation of the another embodiment of the invention.
Figure 11:
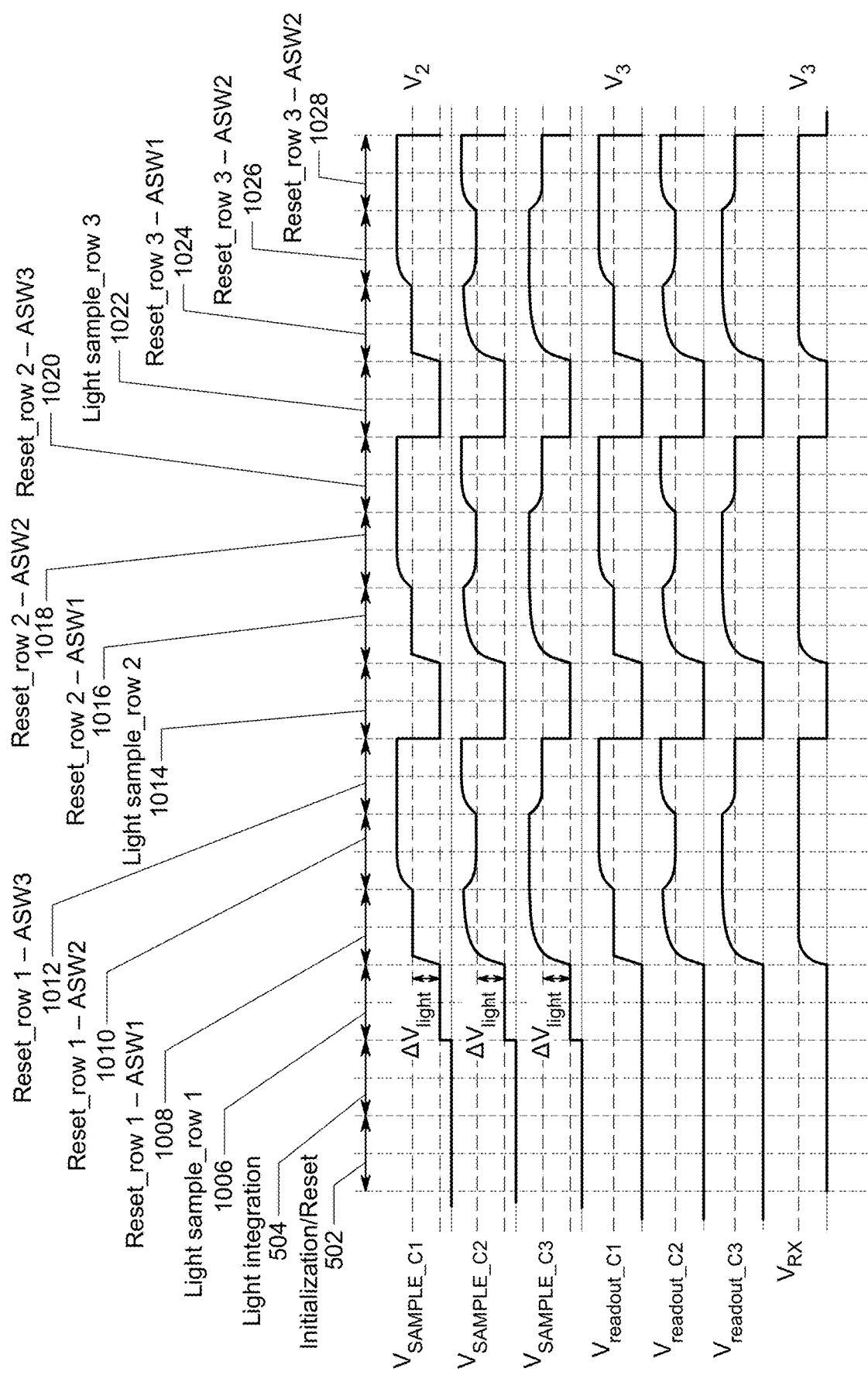
FIG. 11 shows an example of an operation of the another embodiment of the invention.

FIGS. 10 and 11 shows an example of operation of the embodiment in FIGS. 9A and 9B. The operation of the pixel circuit 202 is similar to that of the embodiment in FIG. 5. However, the CDS 804 circuit operation is slightly altered from that of the CDS 204 circuit represented in FIG. 5 due to the inclusion of multiplexing operation.

In particular, during the light sample_row 1 time period 1006, MRST_R1 is low and MREAD_R1 is high as in the embodiment of FIG. 5. MASW1, MASW1, and MASW3 are each also high during the light sample_row 1 time period 1006 allowing the corresponding voltage VG_R1 in row 1 402 to be stored in the CCDS 234.

During reset_row 1-ASW1 time period 1008, MASW1 remains high, while MASW2 and MASW3 become low. Thus, only the stored CCDS 234 value in column 1 406 is output to RX1.

During reset_row 1-ASW2 time period 1010, MASW1 goes low, MASW2 goes high, and MASW3 remains low, thereby allowing the stored CCDS 234 value in column 2 408 to be output to RX1. Similarly, during reset_row 1-ASW3 time period, only the stored CCDS 234 value in column 3 410 is output to RX1.

During light sample_row 2 time period 1014, MRST_R1 and MREAD_R1 go low, while MREAD_R2 goes high, and the corresponding voltage VG_R2 in row m 404 is stored in the CCDS 234 for each column. Then during subsequent time periods reset_row 2-ASW1 1016, reset_row 2-ASW2 1018, and reset_row 2-ASW3 1020, the stored CCDS 234 value in each column of row m 404 is sequentially output to RX1. The operation continues in the same way for other rows, for example as in time periods Light sample_row 3 1022, reset_row 3-ASW1 1024, reset_row 3-ASW2 1026, and reset_row 3-ASW3 1028.

Some of the waveforms in this example and others are rounded to illustrate that the rise or fall times are affected by parasitic impedances and capacitances.

Figure 12A:
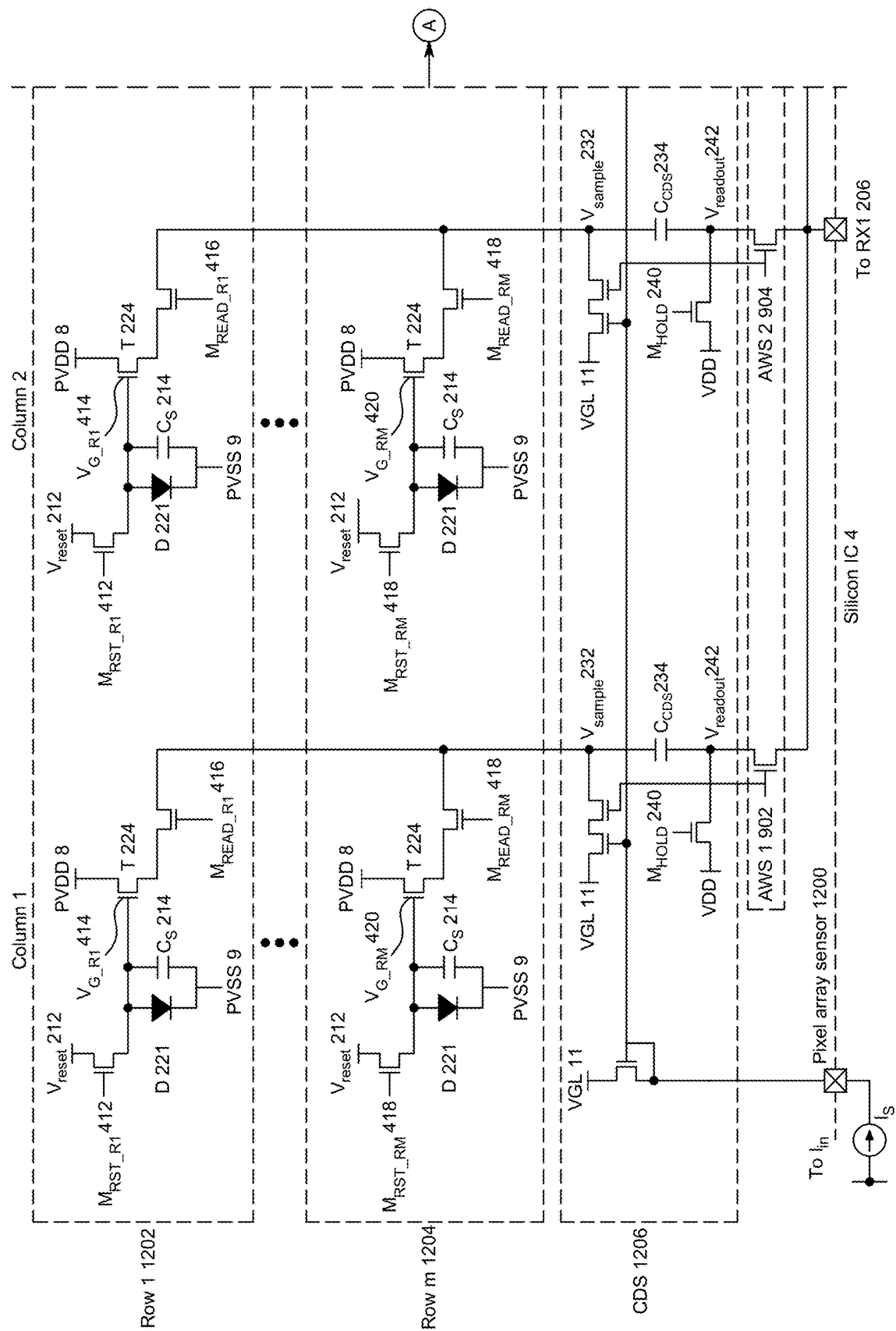
FIG. 12A shows circuit details of another embodiment of the invention.
Figure 12B:
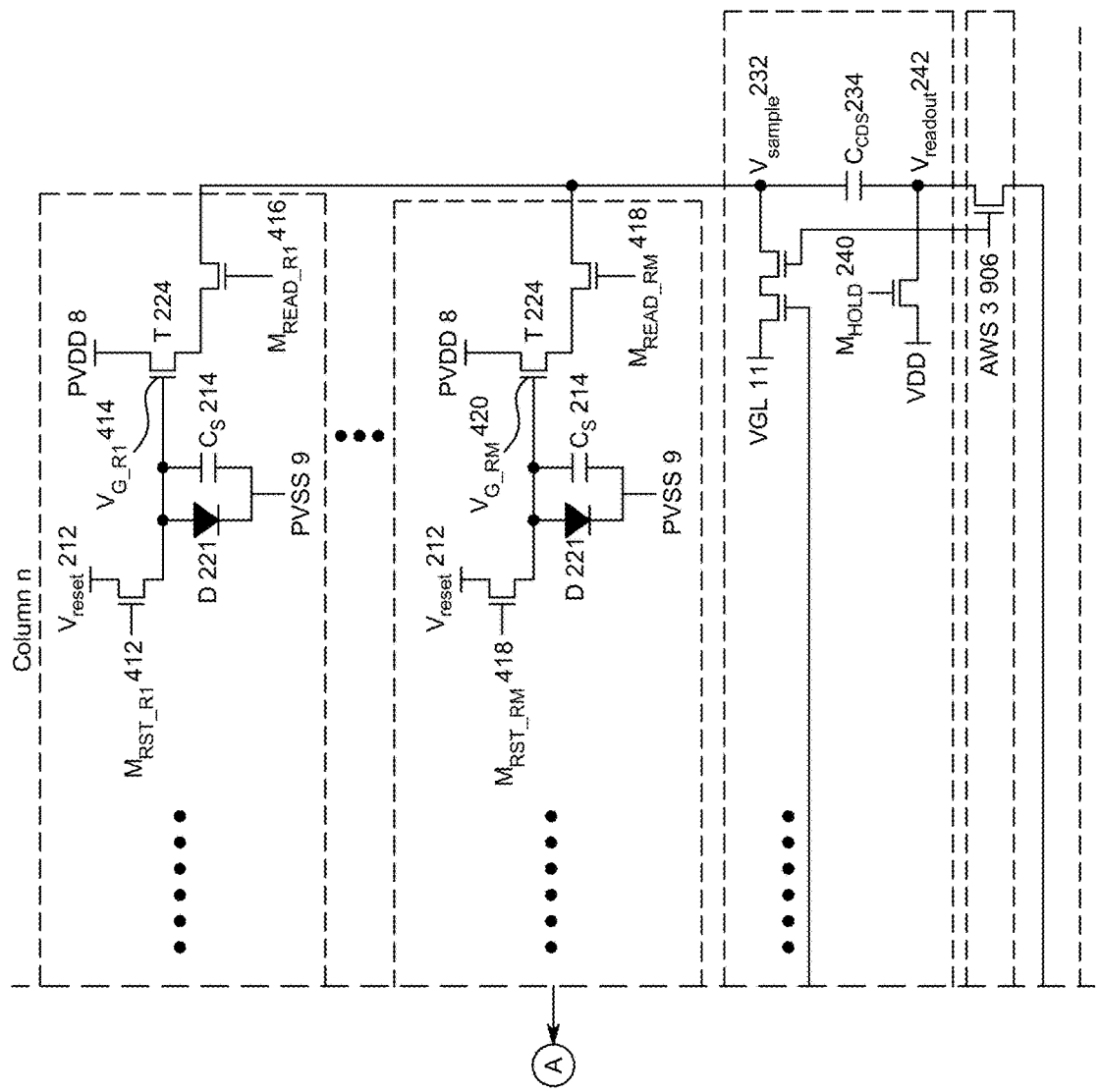
FIG. 12B shows circuit details of another embodiment of the invention.
Figure 13:
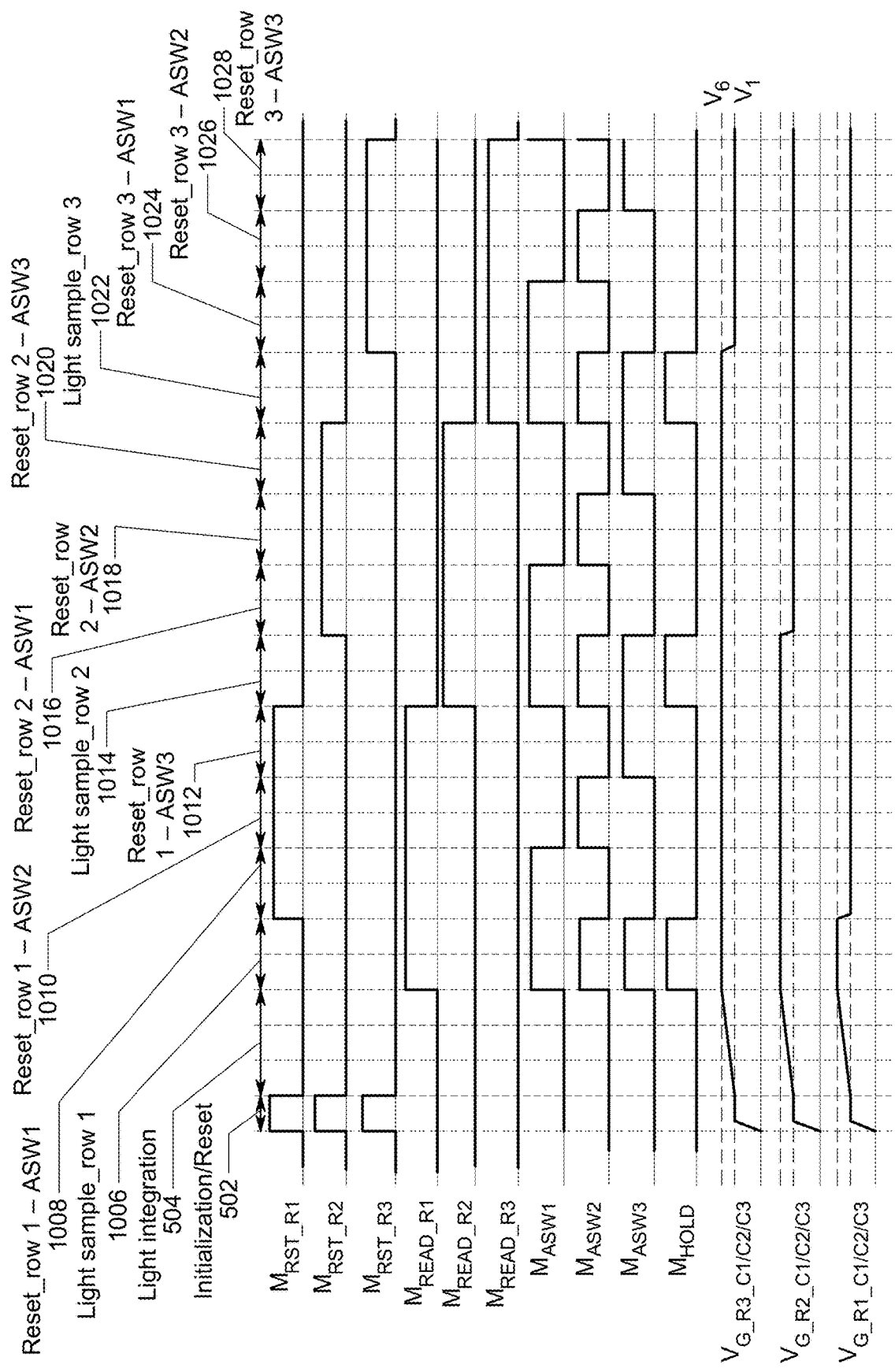
FIG. 13 shows an example of an operation of the another embodiment of the invention.
Figure 14:
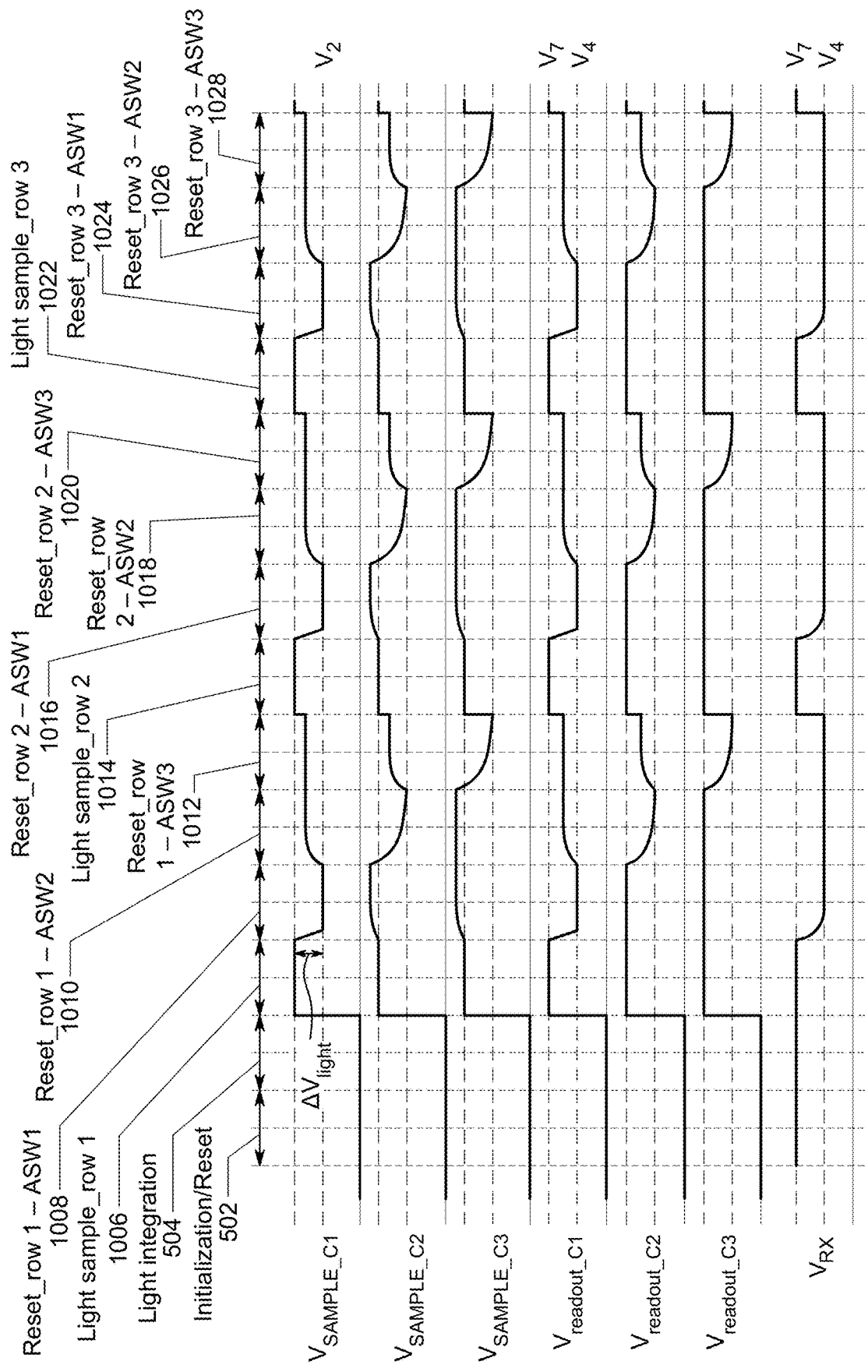
FIG. 14 shows an example of an operation of the another embodiment of the invention.

FIGS. 12A and 12B show an embodiment of pixel array sensor 1200 which is similar to the embodiment of pixel array sensor 800 except the polarity of the light sensitive diode D 221 is reversed. FIGS. 13 and 14 show the operation for the embodiment of FIGS. 12A and 12B, with control signal timing as in FIGS. 10 and 11, and resulting in the corresponding reversed output signal polarities at VRX. Pixel rows 1202/1204 each include pixels arranged in each column 1/2/n. CDS 1206 includes a CDS circuit for each column of pixels, and a TFT after each CDS circuit controls output/multiplexing of the column light detection signal to a shared receiver connection RX1 206.

The embodiments discussed above utilized a current mirror circuit (e.g., as shown in FIG. 3) arranged within the pixel array sensor to act as the ideal current source for each CDS circuit. Such a circuit may require additional interface pins on the pixel array sensor (e.g., a negative supply voltage VGL and an Iin signal). According to the following embodiments, the bias current of each column can be provided from the Silicon IC thereby further reducing the number of interface connections required on the pixel array sensor.

Figure 15:
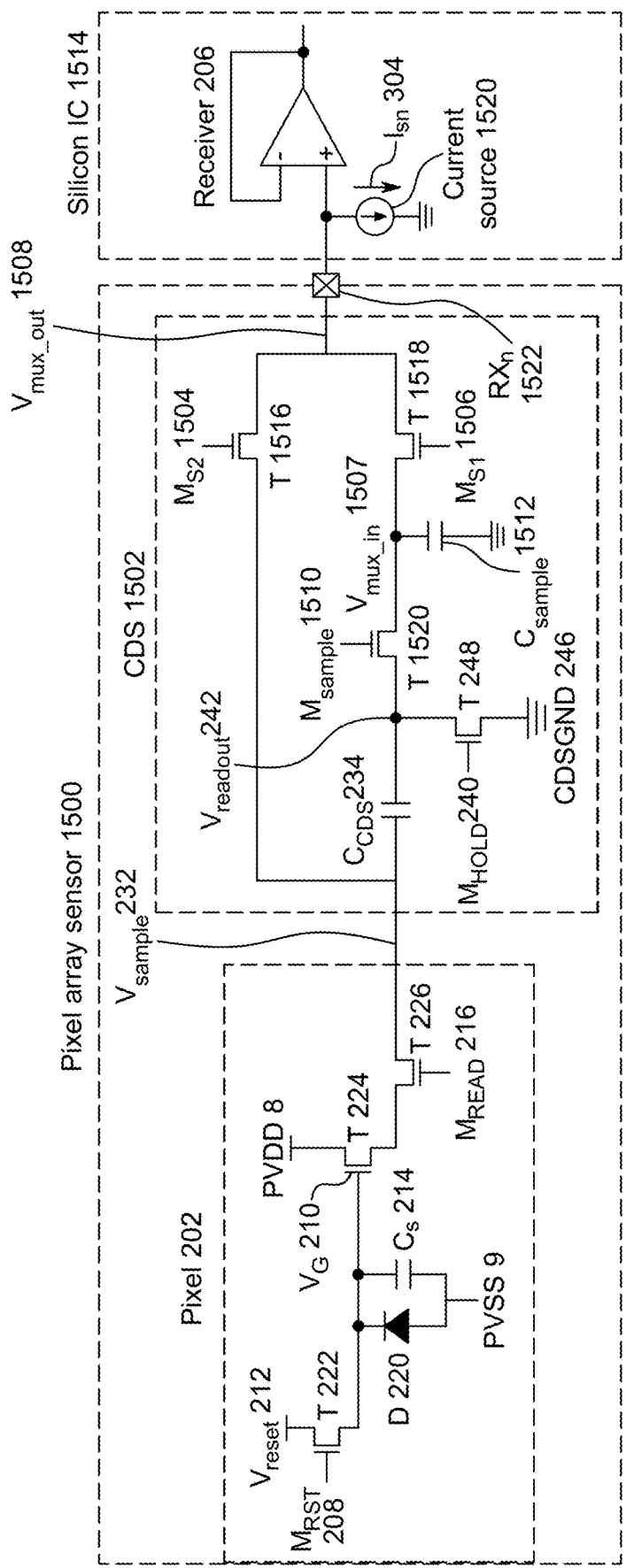
FIG. 15 shows circuit details of another embodiment of the invention.

FIG. 15 shows another embodiment of the invention using pixel array sensor 1500 and silicon IC 1514. Pixel array sensor 1500 includes pixel 202 as in previous embodiments, and also includes CDS 1502, which provides operation allowing for use of a current source 1520 arranged in Silicon IC 1514 and connected via the RXn 1522 connection.

CDS 1502 omits the current source 238 found in the embodiment of CDS 204 in FIG. 2. CDS 1502 includes transistor T 1516 arranged between Vsample 232 and Vmux_out 1508. A gate of T 1516 is provided with control signal MS2 1504. A first side of CCDS 234 is also connected to Vsample 232 and a second side of CCDS is connected to drains of T 248 and T 1520. A gate of T 248 is provided with control signal MHOLD 240. The source of T 248 is connected to CDSGND 246, for example as discussed above with respect to FIG. 2B. A gate of T 1520 is provided with control signal Msample 1510. The drain of T 1520 is connected to one end of Csample and a drain of transistor T 1518. The other end of Csample is connected to ground. A gate of T 1518 receives control signal MS1 1506. A source of T 1518 is connected to Vmux_out 1508, which is connected to RXn 1522. T 1516 is configured to act as a bypass TFT to allow a current source 1520 in the silicon IC 1514 to bias T 224 as a source-follower when the bypass TFT is active.

Figure 16:
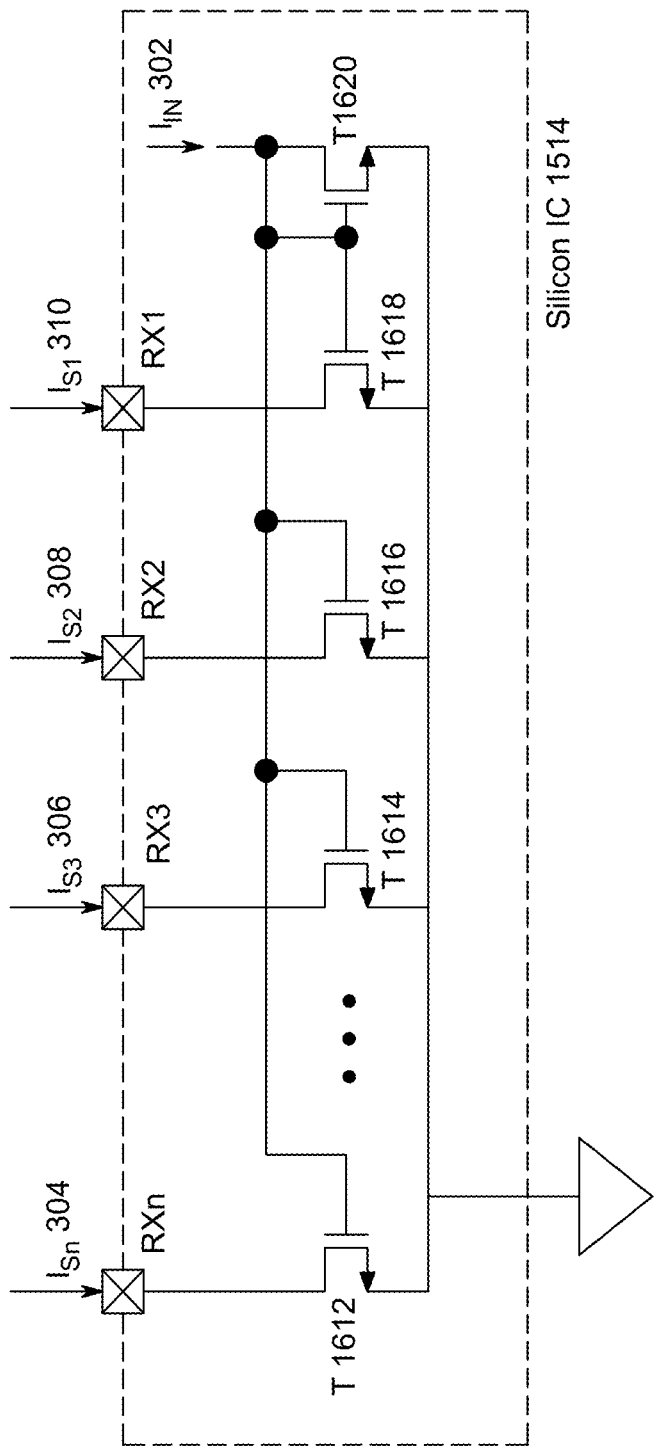
FIG. 16 shows circuit details of another embodiment of the invention.

FIG. 16 shows a detailed view of Silicon IC 1514 including a configuration of current source 1520 that provides a current mirror for each column in the pixel array sensor 1500.

Figure 17A:
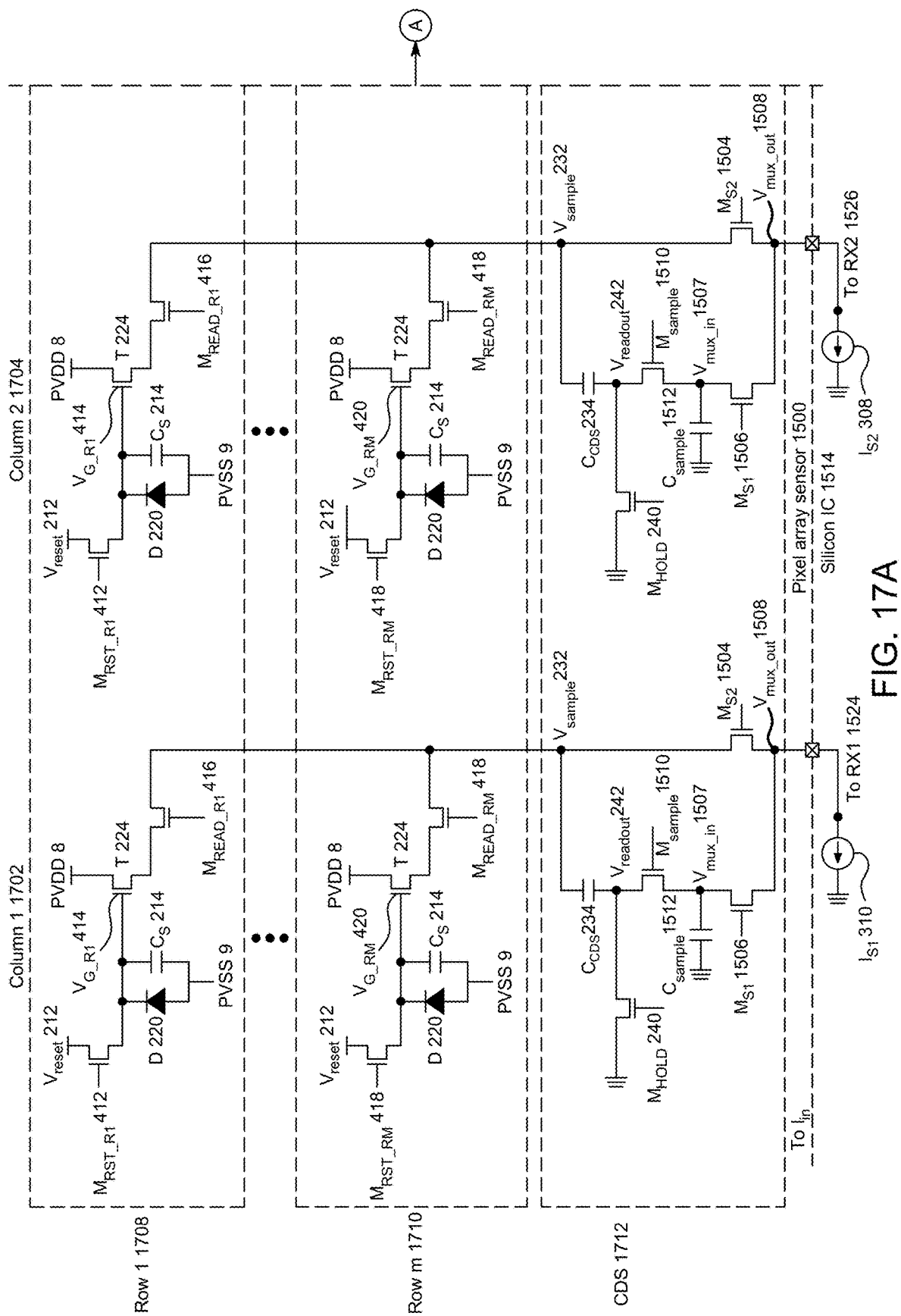
FIG. 17A shows circuit details of another embodiment of the invention.
Figure 17B:
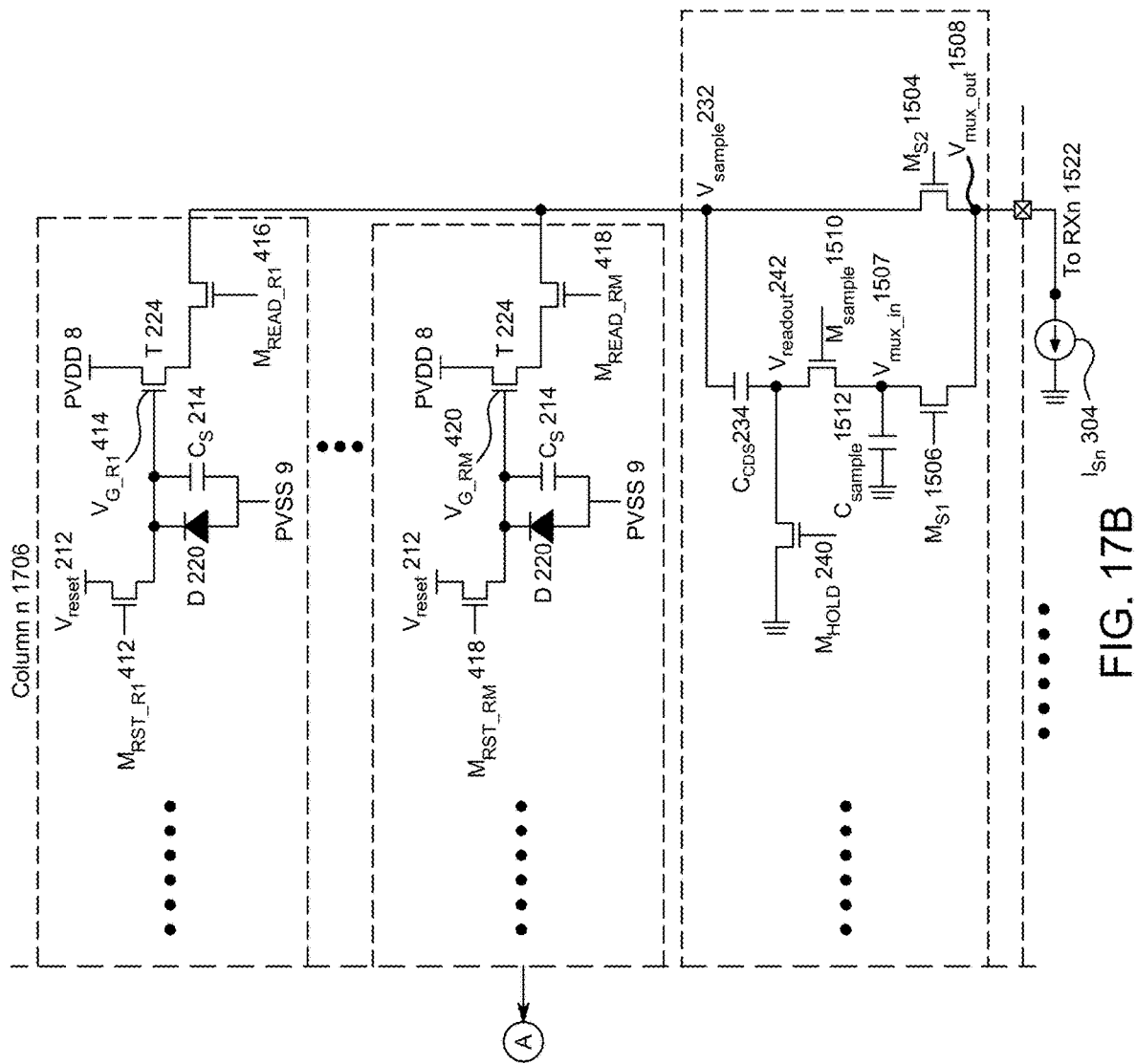
FIG. 17B shows circuit details of another embodiment of the invention.

FIGS. 17A and 17B show an embodiment of the pixel array sensor 1500 with pixel circuits 202 arranged in three columns: column 1 1702, column 2 1704, and column n 1706, and two rows: row 1 1708 and row n 1710. The pixel array sensor 1500 also includes CDS 1712 including a CDS 1502 circuit for each column of pixel circuits 202, and a dedicated output connection for each column connecting to a corresponding one of RX1 . . . RXN in the Silicon IC 1514.

Figure 18:
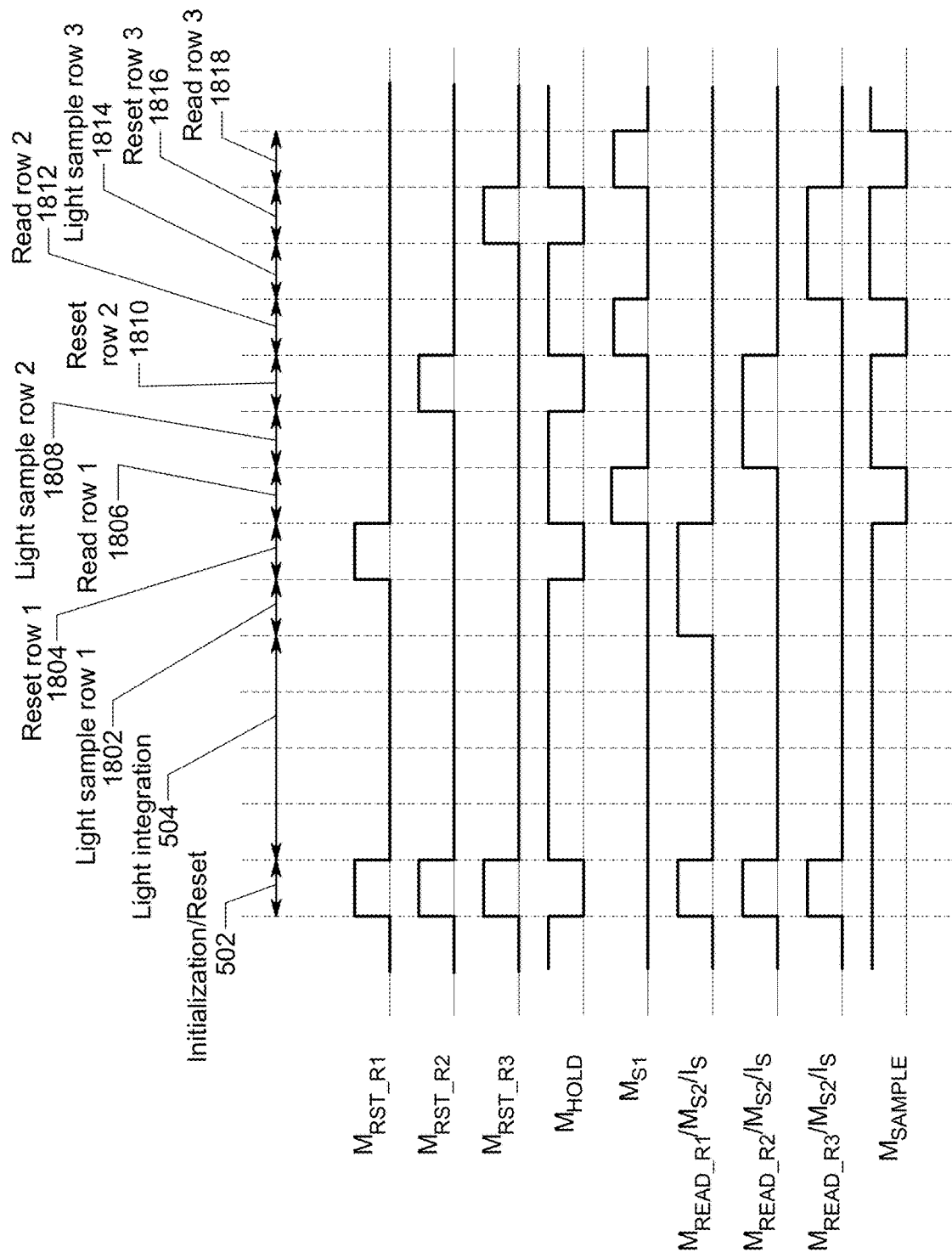
FIG. 18 shows an example of an operation of the another embodiment of the invention.
Figure 19:
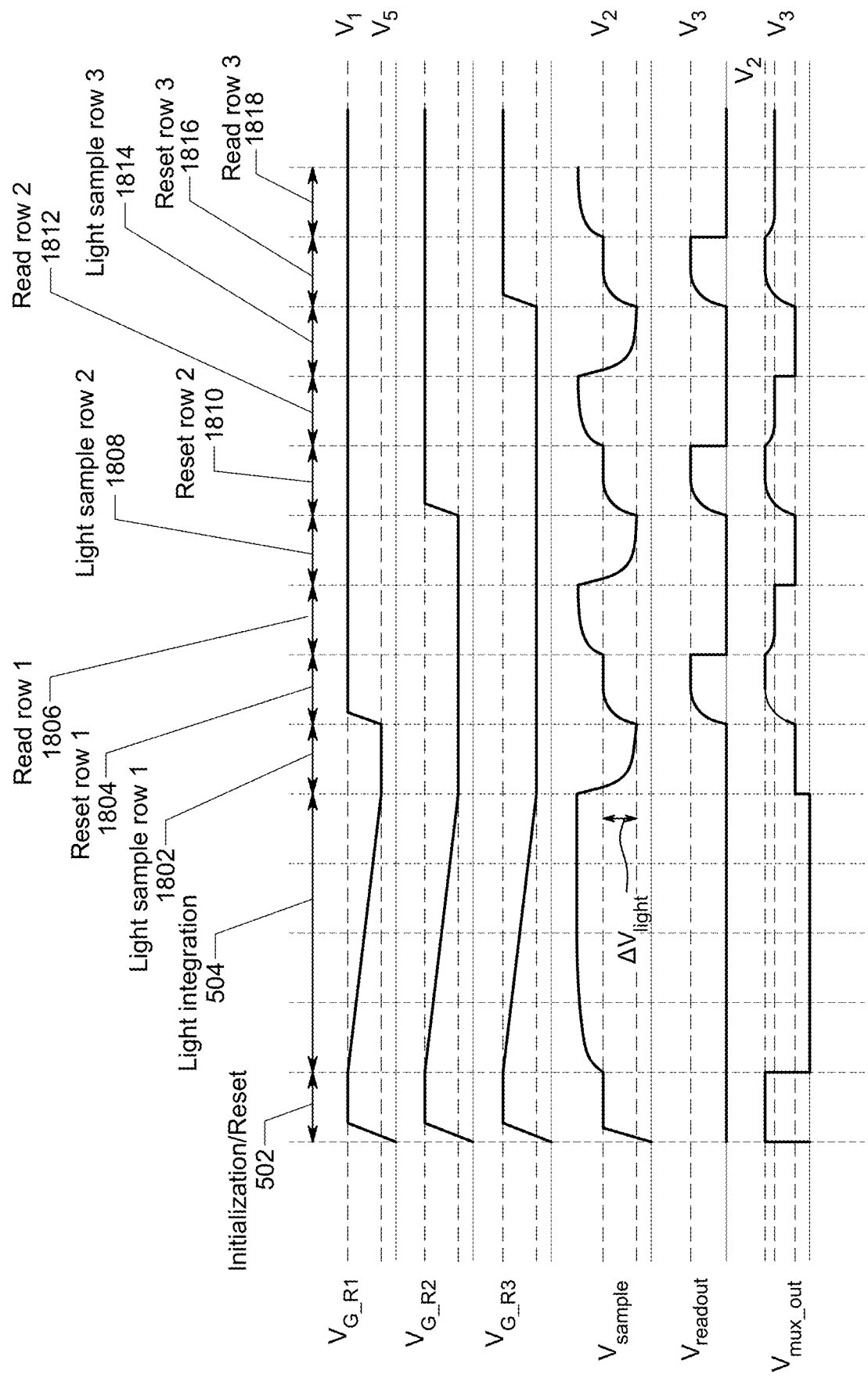
FIG. 19 shows an example of an operation of the another embodiment of the invention.

FIGS. 18 and 19 show an example of operation of the embodiment in FIGS. 17A and 17B. Signals MS1 and MS2 are provided to select whether (1) the CCDS portion of the circuit is bypassed (i.e., when MS2 is active) allowing the current source 1520 in the Silicon IC 1514 to sink current from the source follower transistor T 224 in the pixel 202 circuit, or (2) to output the stored voltage in Csample 1512 to Vmux_out 1508 (i.e., when MS1 is active).

Figure 20A:
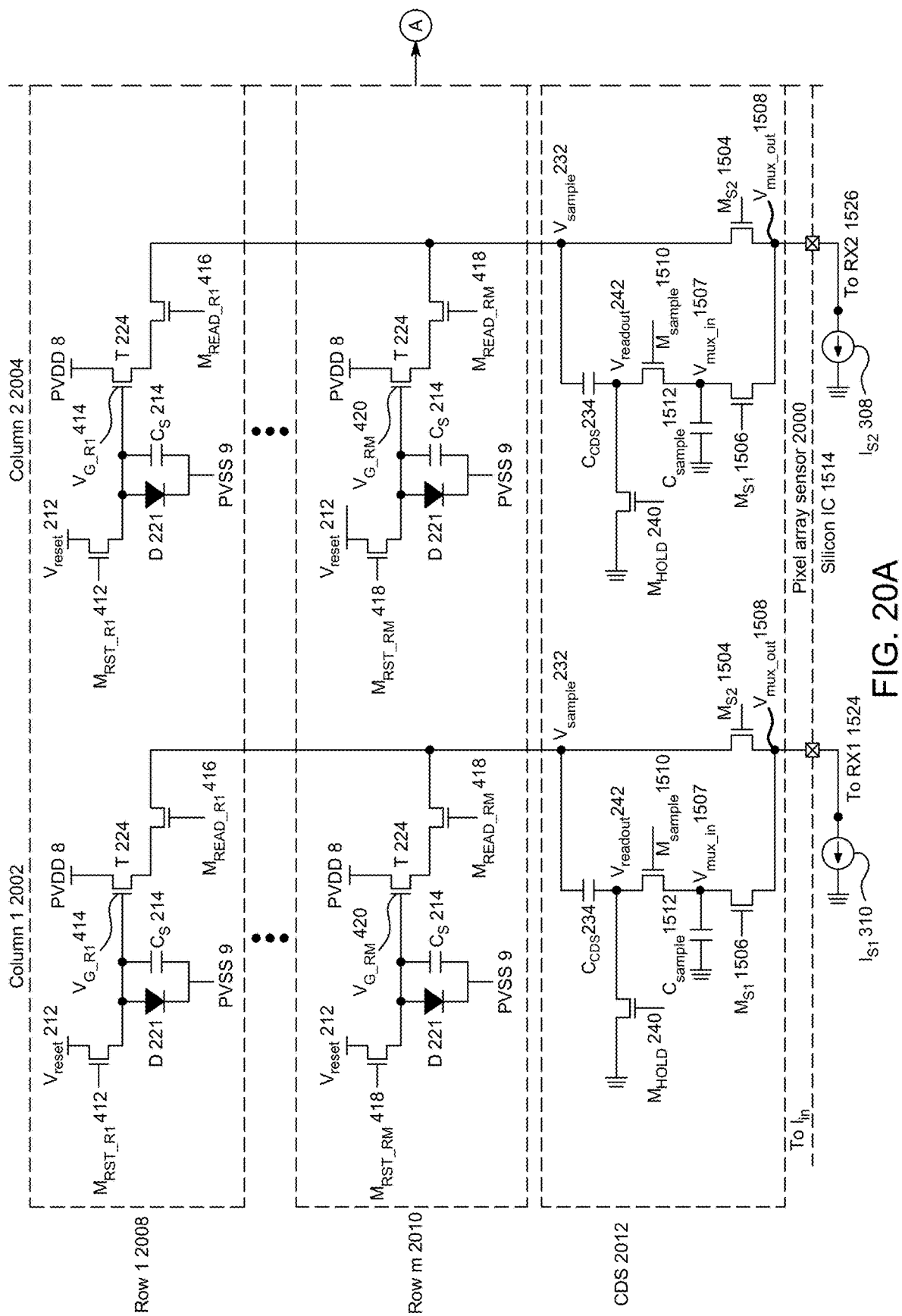
FIG. 20A shows circuit details of another embodiment of the invention.
Figure 20B:
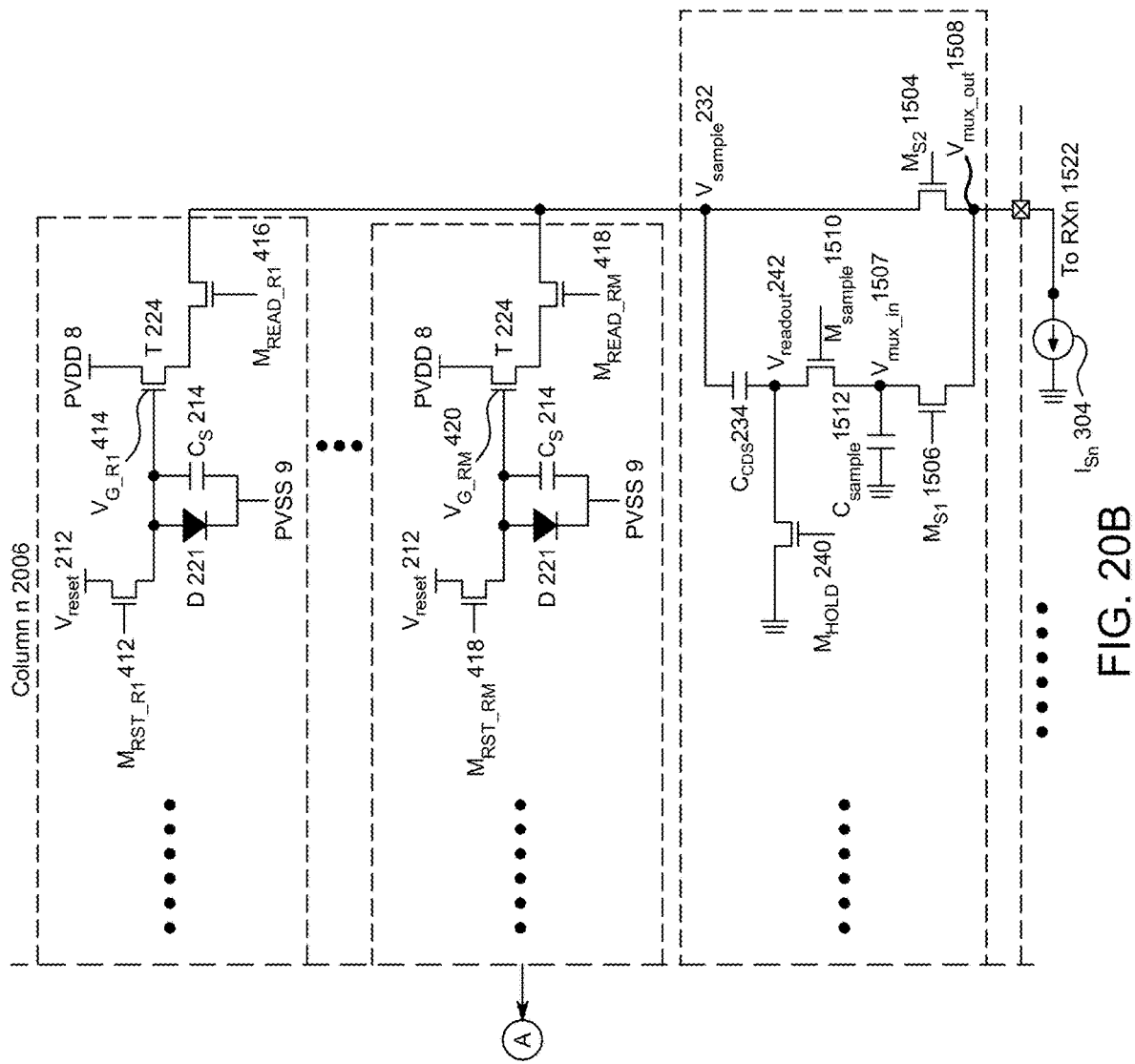
FIG. 20B shows circuit details of another embodiment of the invention.

FIGS. 20A and 20B show an embodiment like that of FIGS. 17A and 17B, respectively, although using a diode D 221 having a reversed polarity in each pixel circuit. Thus, pixel array sensor 2000 in FIGS. 20A and 20B includes pixel circuits arranged in three columns: column 1 2002, column 2 2004, and column n 2006, and two rows: row 1 2008, and row m 2010. The pixel array sensor 2000 also includes CDS 2012 including a CDS 1502 circuit for each column, and a dedicated output connection for each column connecting to a corresponding one of RX1 . . . RXN in the Silicon IC 1514.

Figure 21:
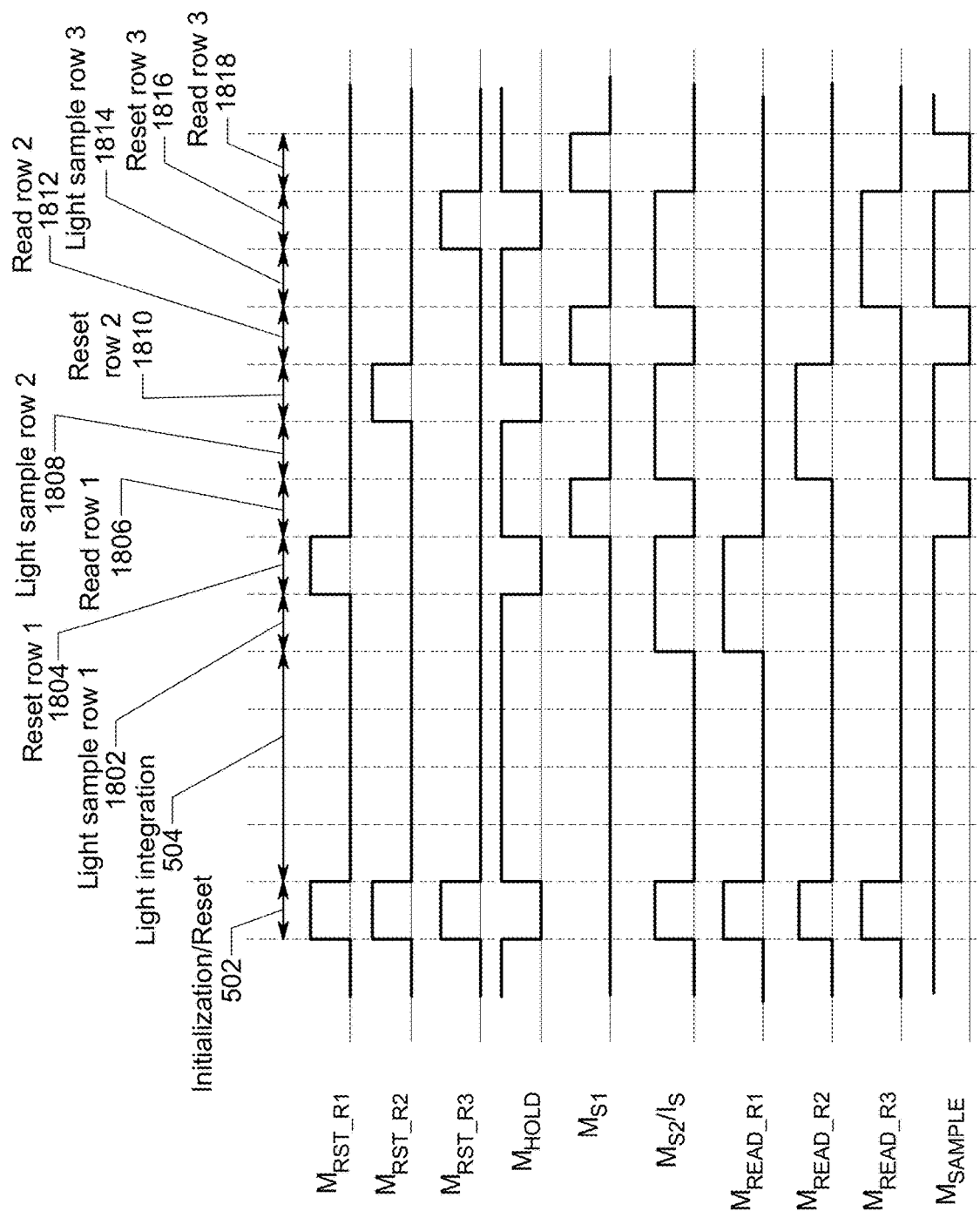
FIG. 21 shows an example of an operation of the another embodiment of the invention.
Figure 22:
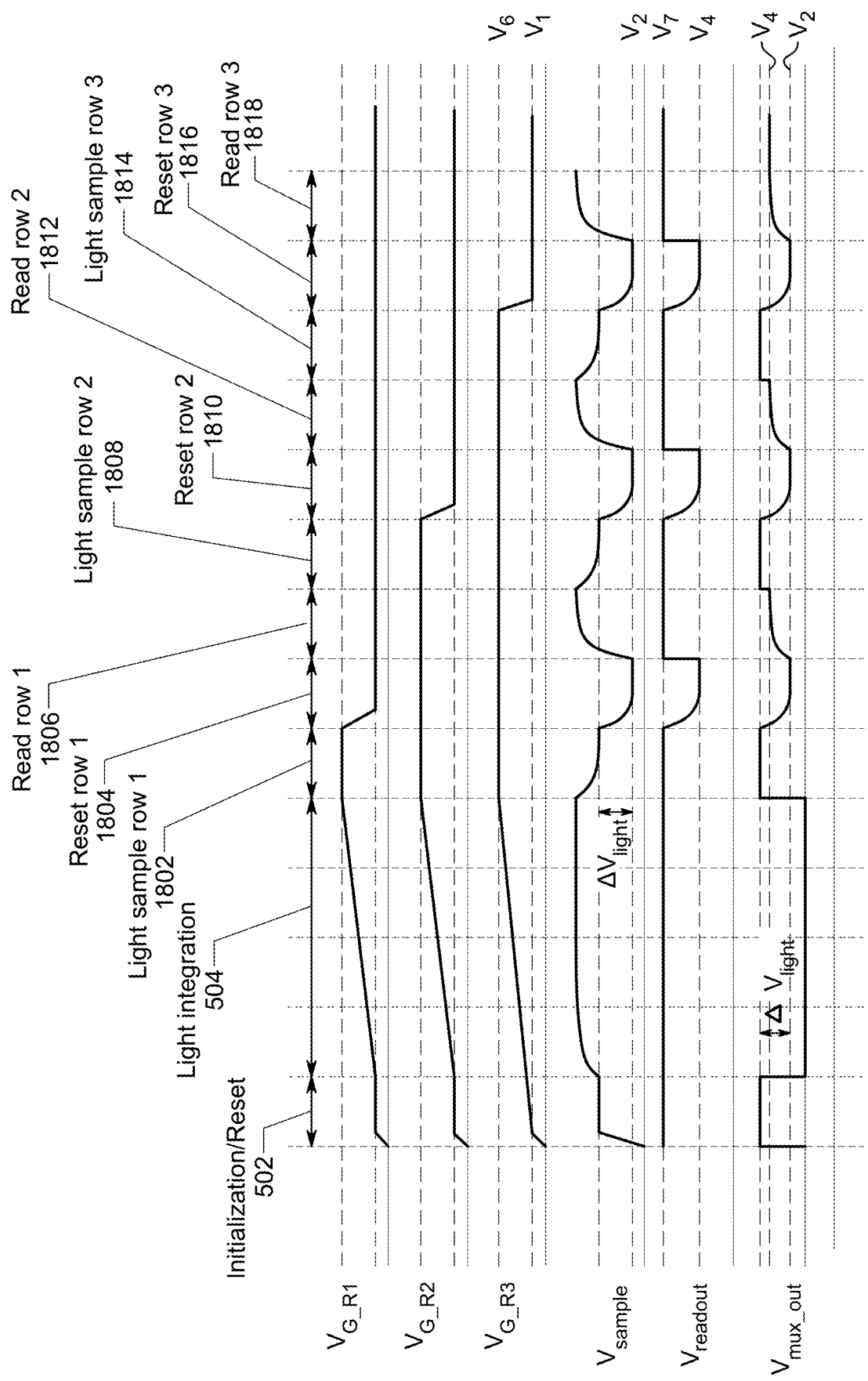
FIG. 22 shows an example of an operation of the another embodiment of the invention.

FIGS. 21 and 22 show an example of operation of the embodiment in FIGS. 20A and 20B. Operation is similar to that of the embodiment in FIGS. 18 and 19, except for the reversed polarity of the light detection diodes.

The embodiments of FIGS. 17A, 17B, 20A, and 20B require a dedicated interface connection between the pixel array sensor and silicon IC for each column.

Figure 23:
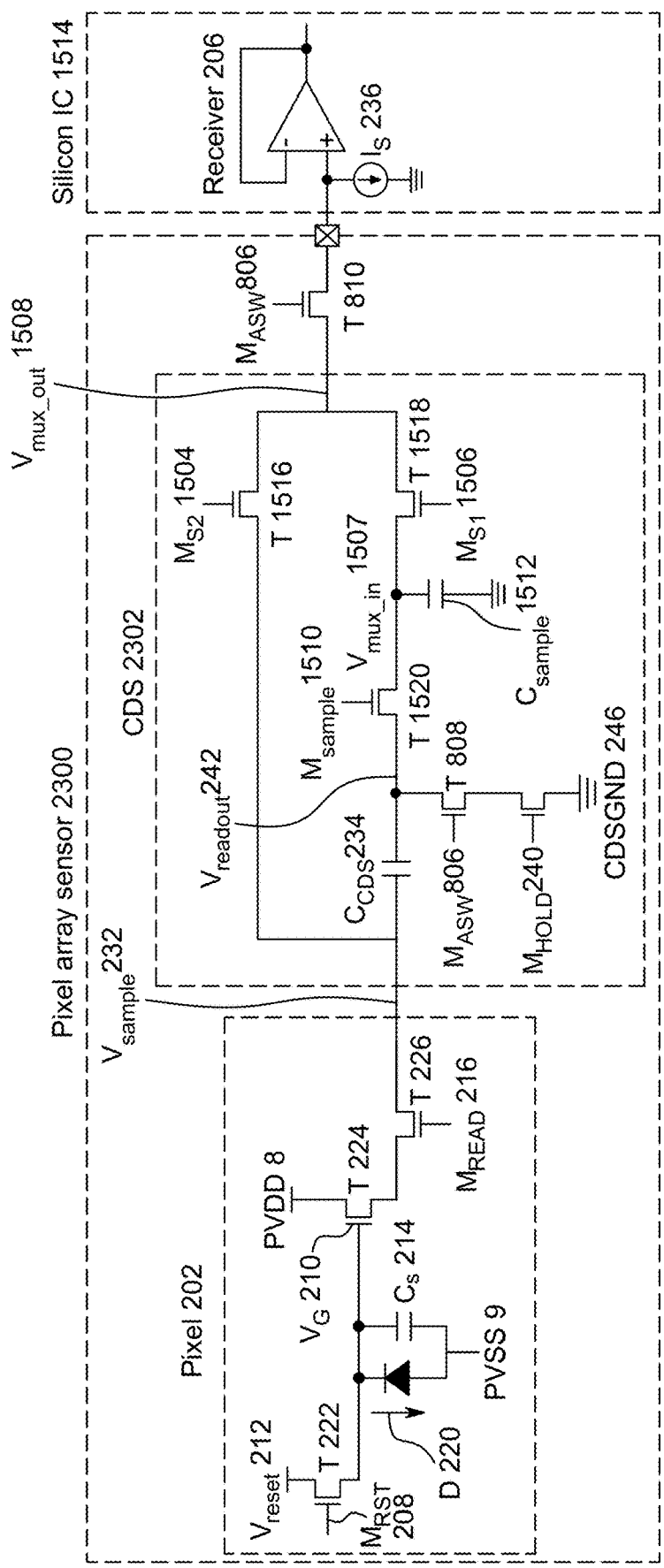
FIG. 23 shows circuit details of another embodiment of the invention.

FIG. 23 shows an embodiment of pixel array sensor 2300 configured to multiplex the interface connections so that more than one column can share single interface connection to the silicon IC. The pixel array sensor 2300 includes pixel 202 and CDS 2302 having an added transistor T 808 as in the embodiment of FIG. 8. Also included is a transistor T 810 at the output of the CDS circuit as in the embodiment of FIG. 8. Gates of transistors T 808 and T 810 are provided with control signal MASW 806.

Figure 24A:
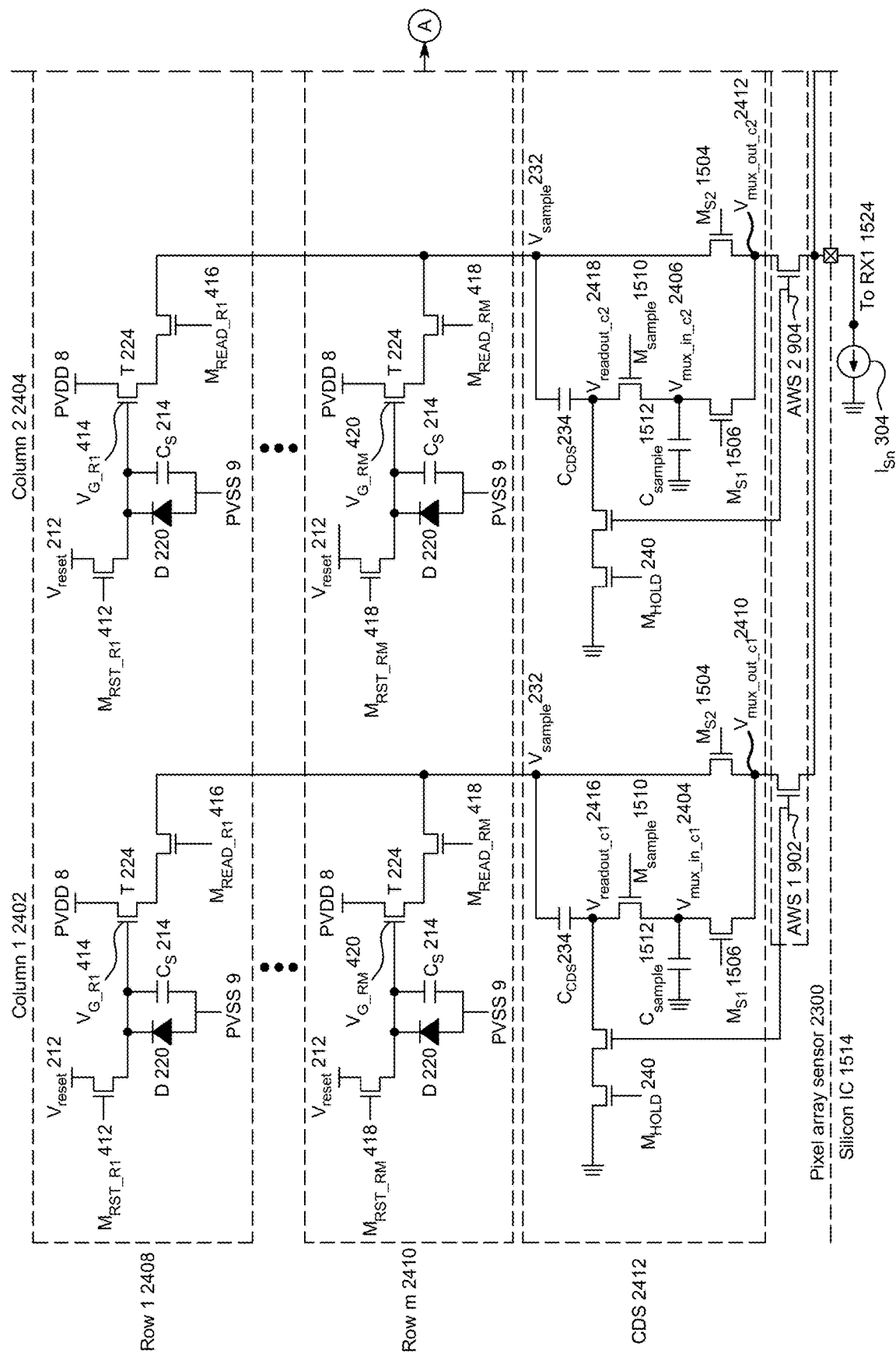
FIG. 24A shows circuit details of another embodiment of the invention.
Figure 24B:
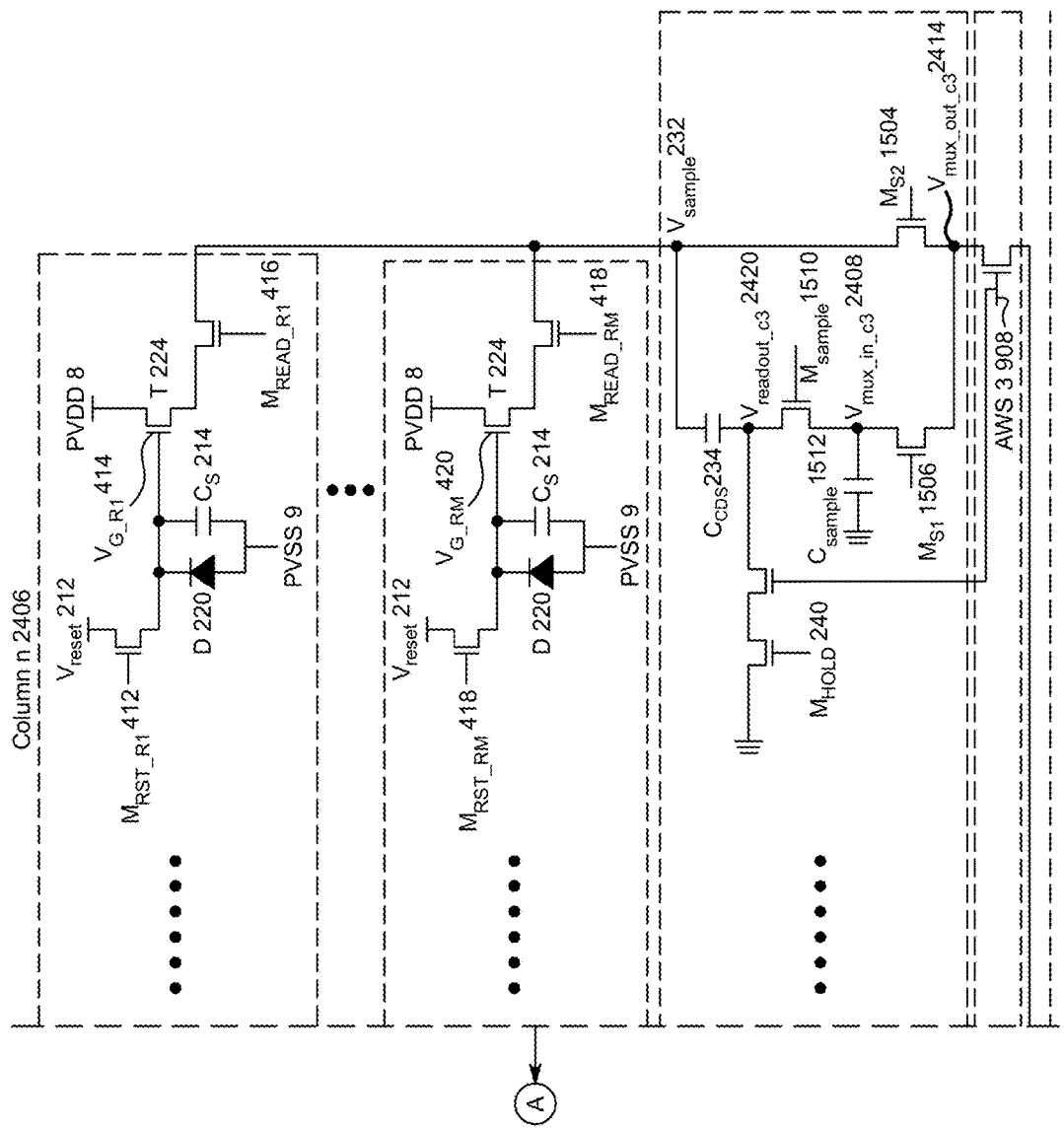
FIG. 24B shows circuit details of another embodiment of the invention.

FIGS. 24A and 24B show an embodiment of pixel array sensor 2300 having pixel circuits 202 arranged in three columns: column 1 2402, column 2 2404, and column n 2406, and two rows: row 1 2408 and row m 2410. The pixel array sensor 2300 also includes a CDS 2412 including a CDS 2302 circuit for each column. The current source circuit for the embodiment in FIGS. 24A and 24B is the same as that shown in FIG. 16.

Figure 25:
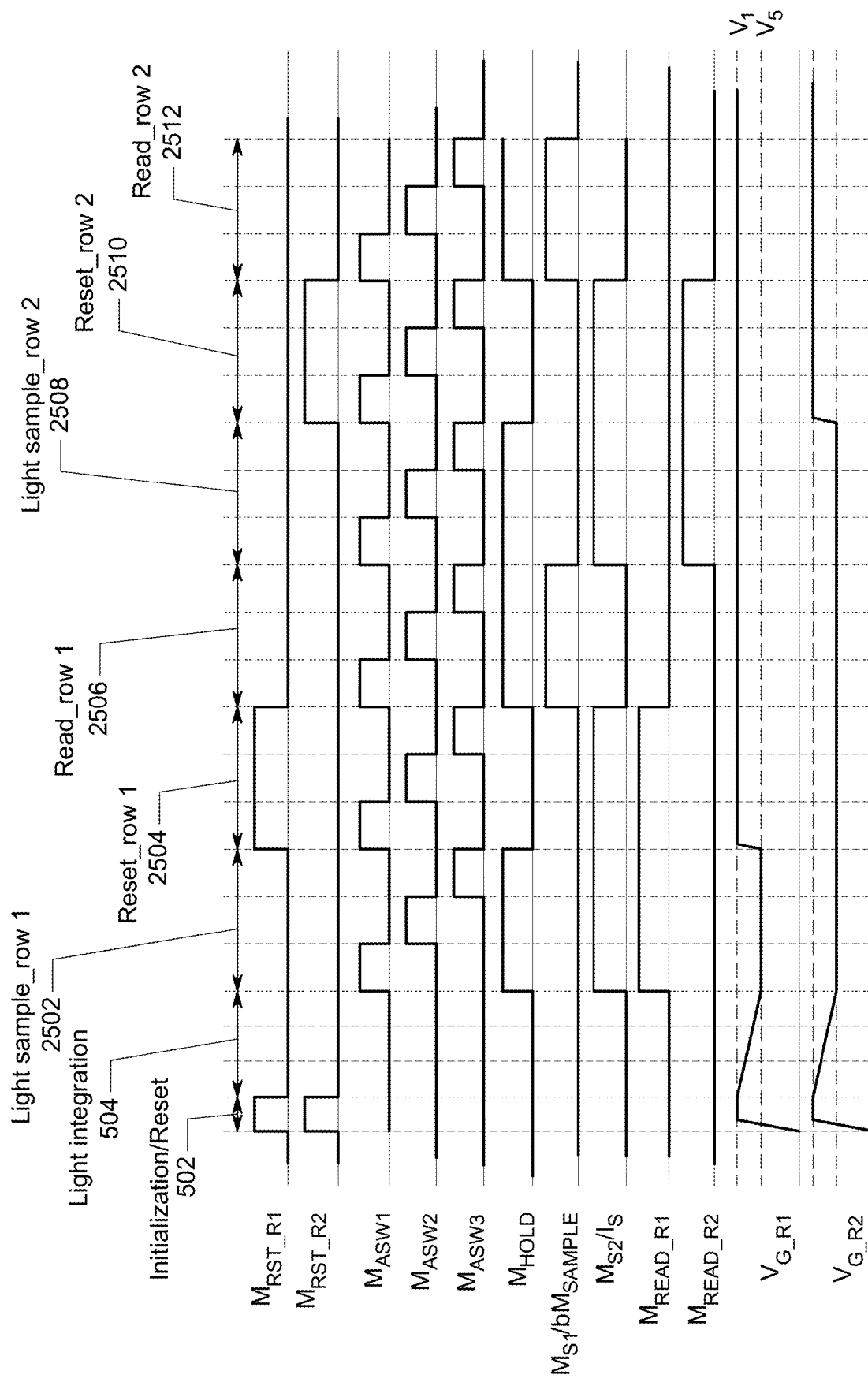
FIG. 25 shows an example of an operation of the another embodiment of the invention.
Figure 26:
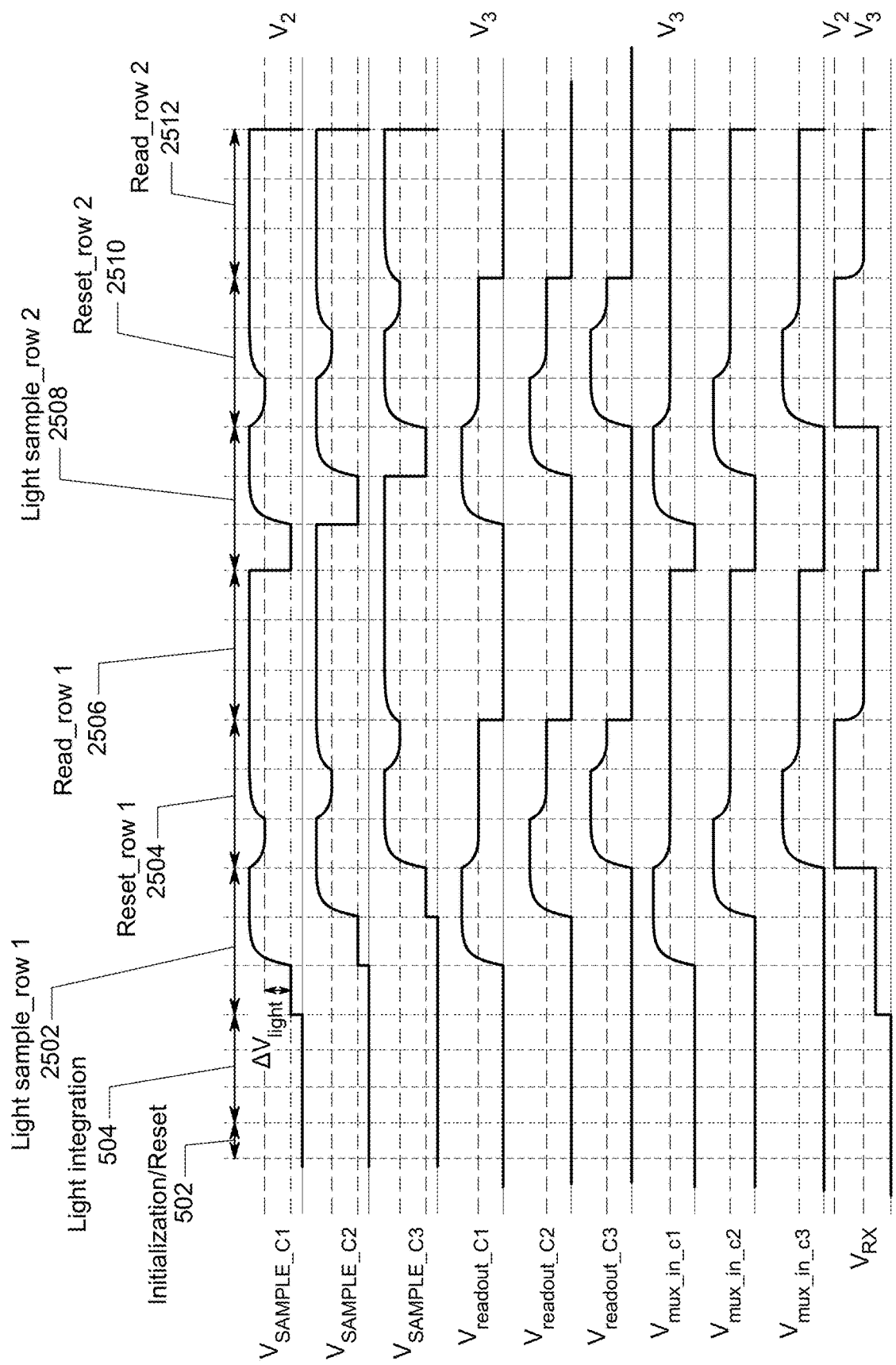
FIG. 26 shows an example of an operation of the another embodiment of the invention.

FIGS. 25 and 26 show an example of operation of the embodiment in FIGS. 24A and 24B. Operation of control signals MS1 and MS2 is similar to the embodiment in FIGS. 18 and 19, and operation of control signal MASW is similar to the embodiment in FIG. 8.

Figure 27A:
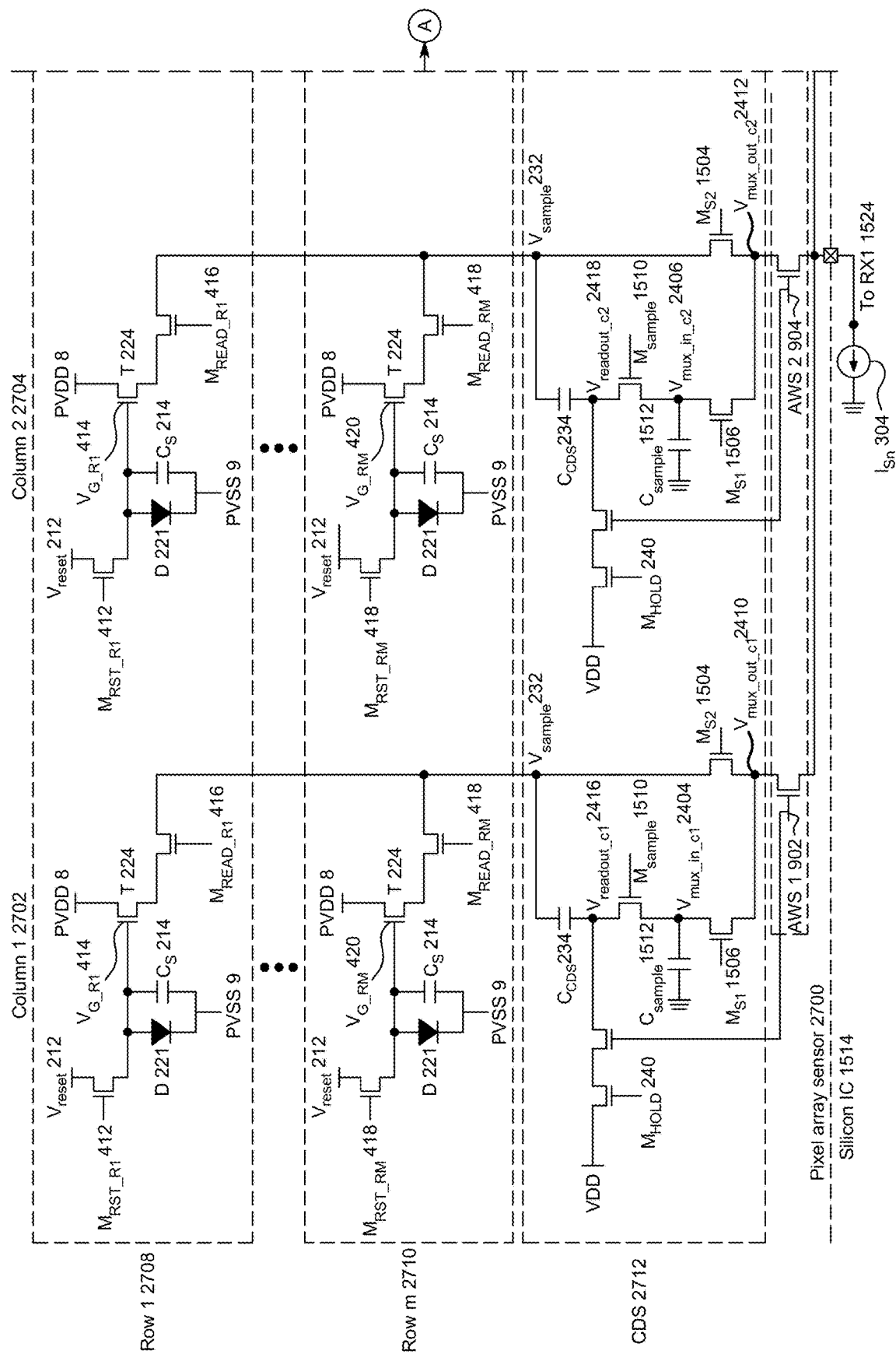
FIG. 27A shows circuit details of another embodiment of the invention.
Figure 27B:
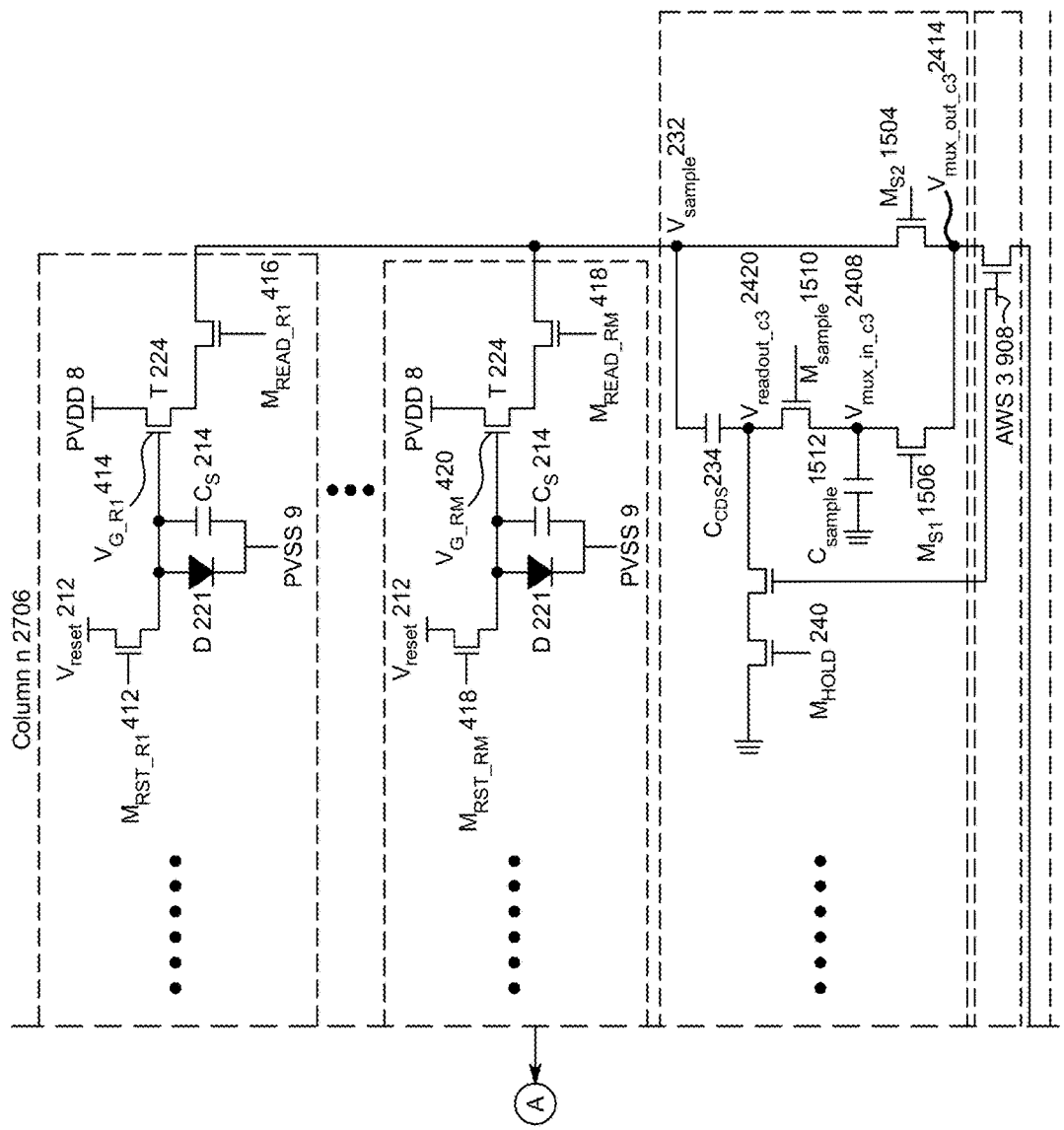
FIG. 27B shows circuit details of another embodiment of the invention.

FIGS. 27A and 27B show an embodiment like that of FIGS. 24A and 24B, respectively, although using a diode D 221 having a reversed polarity in each pixel circuit. Thus, pixel array sensor 2700 includes pixel circuits arranged in three columns: column 1 2702, column 2 2704, and column n 2706, and two rows: row 1 2708 and row m 2710. Pixel array sensor 2700 also includes CDS 2712 including a CDS circuit for each column and single output connection to RX1 1524 in the Silicon IC 1514 that is shared by all three columns.

Figure 28:
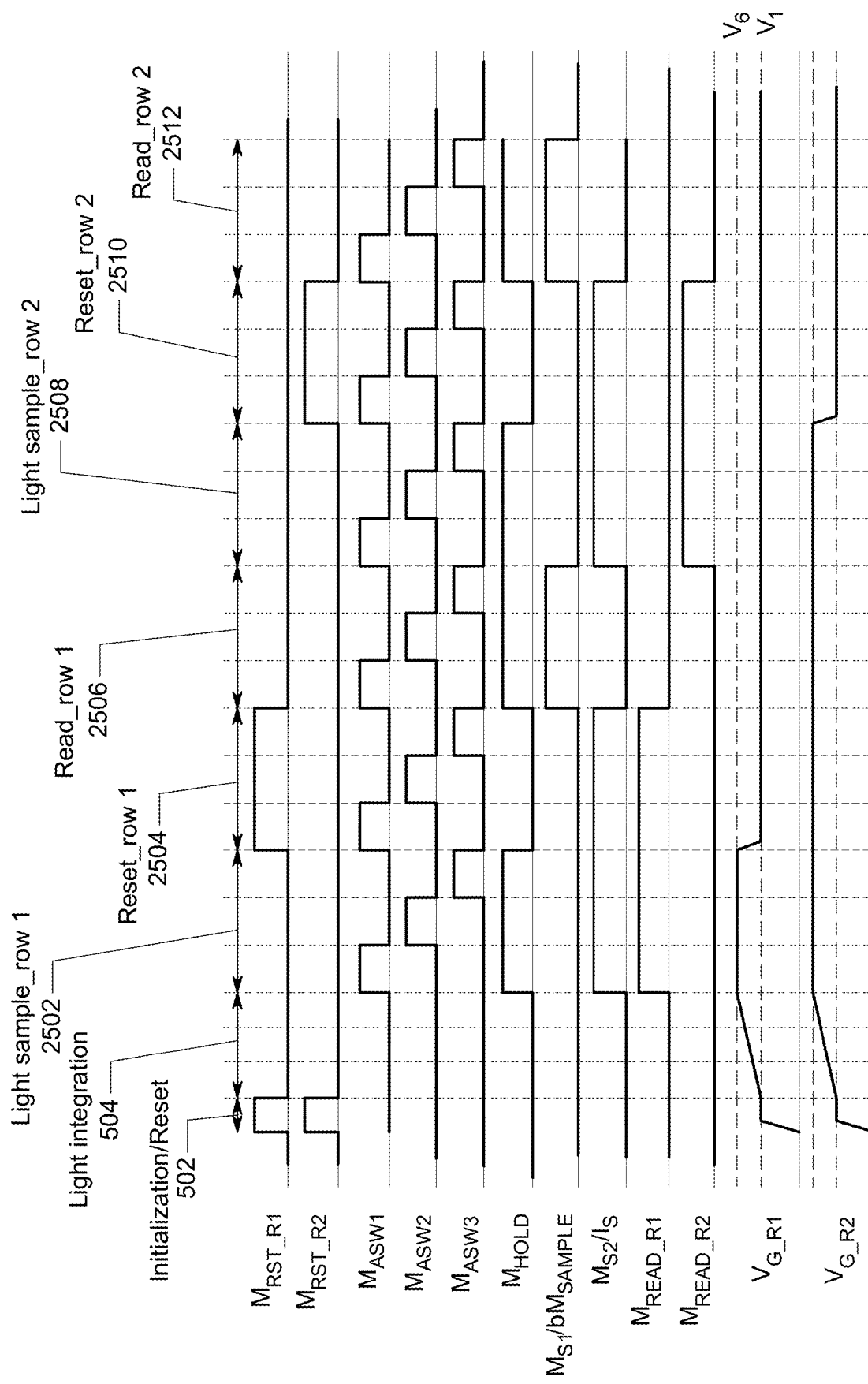
FIG. 28 shows an example of an operation of the another embodiment of the invention.
Figure 29:
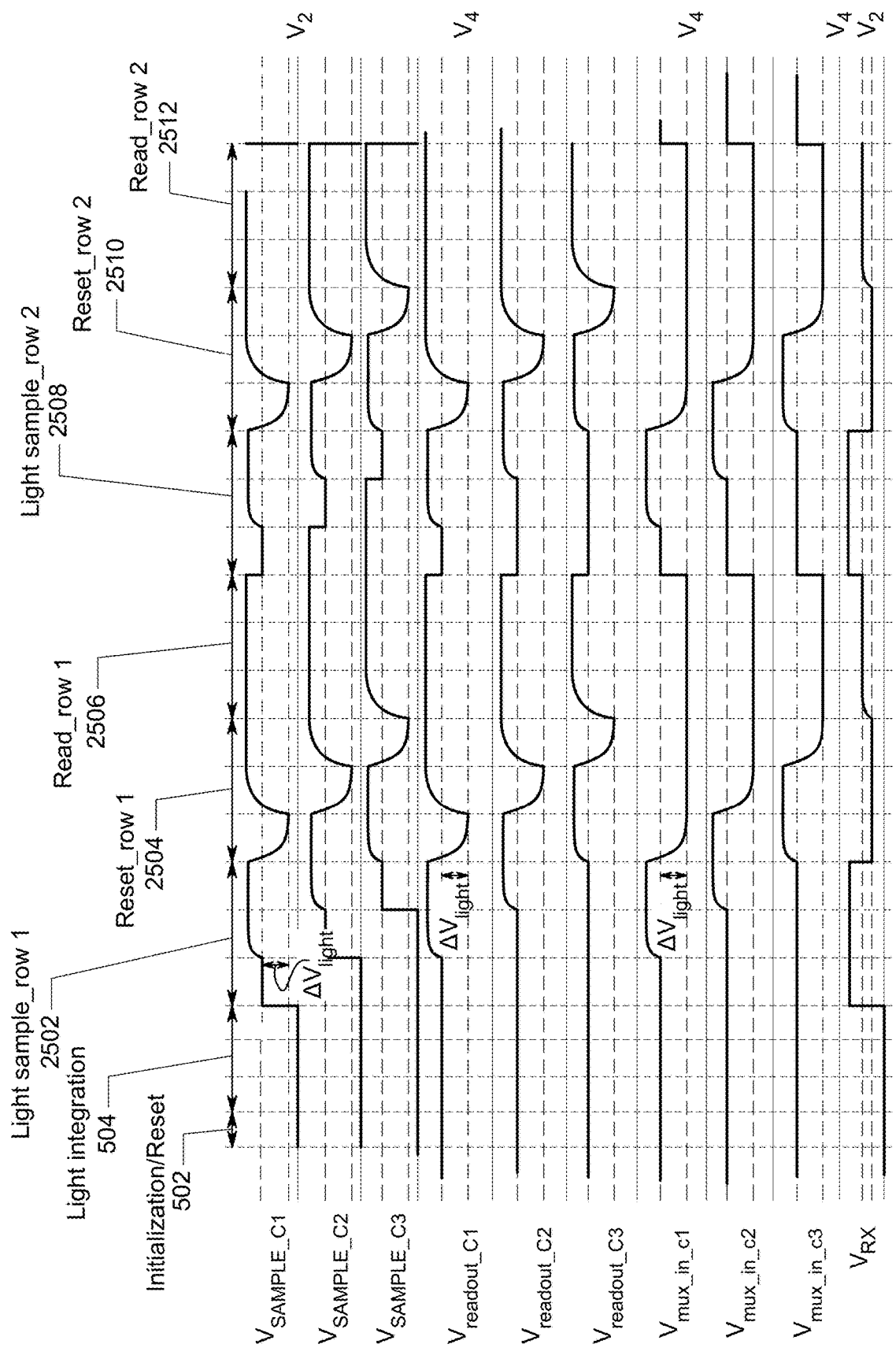
FIG. 29 shows an example of an operation of the another embodiment of the invention.

FIGS. 28 and 29 show an example of operation of the embodiment in FIGS. 27A and 27B. Operation is like the embodiment in FIGS. 25 and 26 except for the reversed polarity resulting from the diode configuration.

Figure 30:
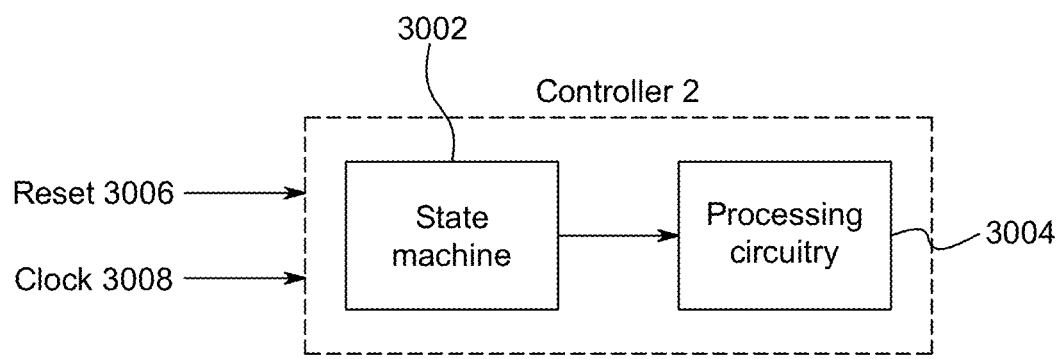
FIG. 30 shows a block diagram of a controller according to an embodiment of the invention.
Figure 31:
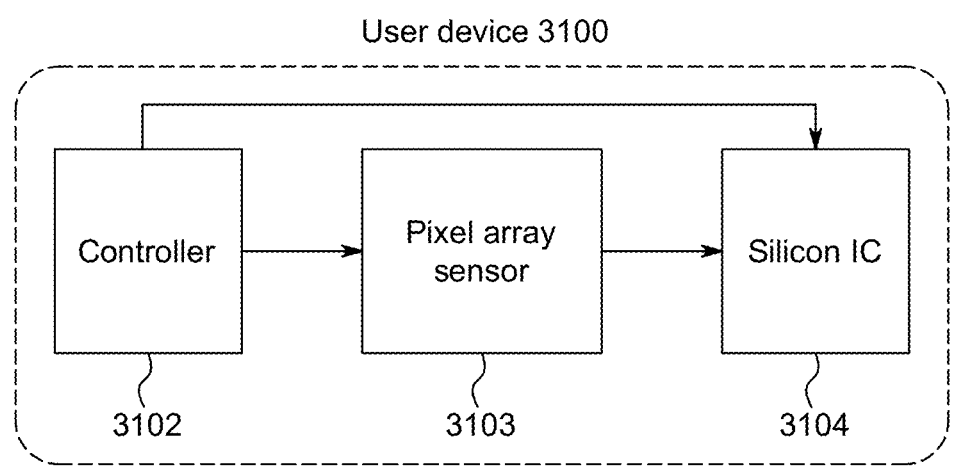
FIG. 31 shows an example of a conventional user device.

FIG. 30 shows an example of a controller 2 that generates each of the control signals used in the pixel array circuit and silicon IC. The controller may receive a system reset signal Reset 3006 that controls the start and end of the controller's output signals, and a clock signal Clock 3008 generated by an oscillator. A programmable register may store settings to control the controller's output signals, including signal period, pulse width, delay, duration, etc. . . . . The controller 2 may include a state machine 3002 and/or a processing circuit 3004, each of which may be implemented using one or more programmable processors (e.g., programmed microcontroller, microprocessor, and/or controller, programmed by higher order language and/or machine level instructions) and/or dedicated logic circuits (e.g., an application specific integrated circuit (ASIC), discrete logic, or field programmable gate array (FPGA)).

What is claimed is:

1. A light sensing apparatus comprising:
a pixel array including Thin Film Transistors (TFTs);
an interface integrated circuit including silicon transistors, the pixel array including
a plurality of pixel circuits, each of the plurality of pixel circuits including a light sensitive device and a detection TFT connected to the light sensitive device, and
a plurality of correlated double sampling (CDS) circuits each including a current source configured to provide current that biases the detection TFT in one of the pixel circuits to be configured as a source-follower; and
the interface integrated circuit including at least one receiver circuit configured to receive an output of at least one of the CDS circuits, wherein
each of the CDS circuits includes a capacitor;
a first side of the capacitor is connected to an output of a pixel and the current source;
a second side of the capacitor is connected to the receiver in the interface integrated circuit via a contact on a connector of the pixel array;
each CDS circuit further includes a hold TFT;
a drain of the hold TFT is connected the second side of the capacitor; and
a source of the hold TFT is connected to a variable ground voltage.

2. The light sensing apparatus according to claim 1, further comprising:
a control circuit configured to drive a gate of the hold TFT in each CDS circuit to thereby control a timing of an operation of each CDS circuit.

3. The light sensing apparatus according to claim 2, wherein:
each of the plurality of pixel circuits further includes a reset TFT and a read TFT; and
the control circuit is further configured to drive a gate of the reset TFT and a gate of the read TFT to control a timing of an operation to transfer a voltage generated by a light received at the light sensing device to the receiver via the CDS circuit.

4. The light sensing apparatus according to claim 1, wherein:
the pixel array further includes a current mirror circuit including
a plurality of mirror TFTs each configured to provide a mirror current as the current source of one of the CDS circuits, and
a main TFT configured to receive a drive current from the interface integrated circuit to thereby control the mirror current in each of the plurality of mirror TFTs.

5. The light sensing apparatus according to claim 1, wherein:
the plurality of pixel circuits are arranged in rows and columns of pixel circuits;
each of the plurality of CDS circuits is connected to a different column of pixel circuits included in the plurality of pixel circuits; and
an output of each of the plurality of CDS circuits is provided to the at least one receiver circuit.

6. The light sensing apparatus according to claim 1, wherein:
each of the plurality of CDS circuits further includes a multiplex TFT connected between the capacitor and the receiver;
the plurality of pixel circuits are arranged in rows and columns of pixel circuits;
each of the plurality of CDS circuits is connected to a different column of pixel circuits included in the plurality of pixel circuits; and
outputs of at least two of the plurality of CDS circuits are provided to one receiver circuit.

7. A light sensing apparatus comprising:
a pixel array including Thin Film Transistors (TFTs);
an interface integrated circuit including silicon transistors, the pixel array including
a plurality of pixel circuits, each of the plurality of pixel circuits including a light sensitive device and a detection TFT connected to the light sensitive device, and
a plurality of correlated double sampling (CDS) circuits each including a bypass TFT; and
the interface integrated circuit including
a current source configured to provide current that biases a detection TFT in one of the pixel circuits to be configured as a source-follower when the bypass TFT is active, and
at least one receiver circuit configured to receive an output of at least one of the CDS circuits, wherein
each of the CDS circuits includes a CDS capacitor;
a first side of the CDS capacitor is connected to an output of a pixel and the current source;
a second side of the CDS capacitor is connected to the receiver in the interface integrated circuit via an additional circuit and a contact on a connector of the pixel array;
each CDS circuit further includes a hold TFT and the additional circuit including a sample TFT, a sample capacitor, and a second bypass TFT:
a drain of the sample TFT is connected to the second side of the CDS capacitor;
a source of the sample TFT is connected to a first side of the sample capacitor;
a second side of the sample capacitor is connected to a ground;
a drain of the second bypass TFT is connected to the first side of the sample capacitor;
a source of the second bypass TFT is connected to the contact on the connector of the pixel array;
a drain of the hold TFT is connected the second side of the CDS capacitor; and
a source of the hold TFT is connected to a variable ground voltage.

8. The light sensing apparatus according to claim 7, further comprising:

a control circuit configured to drive a gate of the hold TFT, a gate of the sample TFT, a gate of the second bypass TFT, and a gate of the bypass TFT in each CDS circuit to thereby control a timing of an operation of each CDS circuit.

9. The light sensing apparatus according to claim 8, wherein:
each of the plurality of pixel circuits further includes a reset TFT and a read TFT; and
the control circuit is further configured to drive a gate of the reset TFT and a gate of the read TFT to control a timing of an operation to transfer a voltage generated by a light received at the light sensing device to the receiver via the CDS circuit.

10. The light sensing apparatus according to claim 7, wherein:
the plurality of pixel circuits are arranged in rows and columns of pixel circuits;
each of the plurality of CDS circuits is connected to a different column of pixel circuits included in the plurality of pixel circuits; and
an output of each of the plurality of CDS circuits is provided to the at least one receiver circuit.

11. The light sensing apparatus according to claim 7, wherein:
each of the plurality of CDS circuits further includes a multiplex TFT connected between the CDS capacitor and the receiver;
the plurality of pixel circuits are arranged in rows and columns of pixel circuits;
each of the plurality of CDS circuits is connected to a different column of pixel circuits included in the plurality of pixel circuits; and
outputs of at least two of the plurality of CDS circuits are provided to one receiver circuit.

12. A light sensing apparatus comprising:
a pixel array including Thin Film Transistors (TFTs);
an interface integrated circuit including silicon transistors,
the pixel array including
a plurality of pixel circuits, each of the plurality of pixel circuits including a light sensitive device and a detection TFT connected to the light sensitive device, and
a plurality of correlated double sampling (CDS) circuits each including a bypass TFT; and
the interface integrated circuit including
a current source configured to provide current that biases the detection TFT in one of the pixel circuits to be configured as a source-follower when the bypass TFT is active, and
at least one receiver circuit configured to receive an output of at least one of the CDS circuits,
wherein:
each of the CDS circuits includes a CDS capacitor:
a first side of the CDS capacitor is connected to an output of a pixel and the current source;
a second side of the CDS capacitor is connected to the receiver in the interface integrated circuit via an additional circuit and a contact on a connector of the pixel array;
each CDS circuit further includes a first multiplex TFT and a hold TFT;
a drain of the first multiplex TFT is connected to the second side of the CDS capacitor;
a source of the first multiplex TFT is connected to a drain of the hold TFT; and
a source of the hold TFT is connected to a variable ground voltage.

13. The light sensing apparatus according to claim 12, further comprising:
a control circuit configured to drive a gate of the hold TFT, a gate of the first multiplex TFT, and a gate of the bypass TFT in each CDS circuit to thereby control a timing of an operation of each CDS circuit.

14. The light sensing apparatus according to claim 13, wherein:
each of the plurality of pixel circuits further includes a reset TFT and a read TFT; and
the control circuit is further configured to drive a gate of the reset TFT and a gate of the read TFT to control a timing of an operation to transfer a voltage generated by a light received at the light sensing device to the receiver via the CDS circuit.

15. The light sensing apparatus according to claim 14, wherein:
the additional circuit includes a sample TFT, a sample capacitor, a second bypass TFT, and a second multiplex TFT;
a drain of the sample TFT is connected to the second side of the CDS capacitor;
a source of the sample TFT is connected to a first side of the sample capacitor and a drain of the second bypass TFT;
a second side of the sample capacitor is connected to ground;
a source of the second bypass TFT is connected to a source of the bypass TFT and a drain of the second multiplex TFT; and
the control circuit is further configured to drive a gate of the sample TFT, a gate of the second bypass TFT, and a gate of the second multiplex TFT to control a timing of an operation to transfer the voltage generated by the light received at the light sensing device to the receiver via the CDS circuit.

* * * * *